US009798570B2

(12) United States Patent
Gallant et al.

(10) Patent No.: US 9,798,570 B2
(45) Date of Patent: Oct. 24, 2017

(54) SYSTEM AND METHOD FOR NESTED HYPERVISORS AND LAYER 2 INTERCONNECTION

(71) Applicant: The Faction Group LLC, Denver, CO (US)

(72) Inventors: Bryan James Gallant, Thornton, CO (US); Luke Mathew Norris, Denver, CO (US); Eric Andrew Culp, Denver, CO (US)

( * ) Notice: Subject to any disclaimer, the term of this patent is extended or adjusted under 35 U.S.C. 154(b) by 66 days.

(21) Appl. No.: 15/052,441

(22) Filed: Feb. 24, 2016

(65) Prior Publication Data

US 2016/0253198 A1 Sep. 1, 2016

Related U.S. Application Data

(60) Provisional application No. 62/126,310, filed on Feb. 27, 2015.

(51) Int. Cl.
*G06F 9/455* (2006.01)

(52) U.S. Cl.
CPC .. *G06F 9/45558* (2013.01); *G06F 2009/4557* (2013.01); *G06F 2009/45566* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,484,639 B2 | 7/2013 | Huang et al. | |
| 8,490,090 B2 | 7/2013 | Ben-Yehuda et al. | |
| 8,819,677 B2 | 8/2014 | Day, II et al. | |
| 8,949,830 B2 | 2/2015 | Kannan et al. | |
| 2011/0075664 A1 | 3/2011 | Lambeth et al. | |
| 2012/0216187 A1 | 8/2012 | Ben-Yehuda et al. | |
| 2013/0036323 A1* | 2/2013 | Goose | G06F 11/1484 714/4.11 |

(Continued)

*Primary Examiner* — Sisley Kim
(74) *Attorney, Agent, or Firm* — Daniel W. Roberts; Law Offices of Daniel W. Roberts, LLC

(57) ABSTRACT

Provided is a system and method for a multi-tenant datacenter with nested hypervisors. This is provided by at least two physical computing systems each having at least one processor and memory store adapted to provide a first level Hypervisors, each providing a First Virtual Computing Environment with a plurality of inactive Virtual Hypervisors nested therein. The multi tenant data center is structured and arranged to activate a Virtual Hypervisor on one of the at least two Hypervisors and automatically migrate the at least one Customer VM from a Customer Hypervisor to the Active Virtual Hypervisor; and evacuate the remaining inactive Virtual Hypervisors from the Hypervisor supporting the Active Hypervisor to another of the at least two Hypervisors supporting inactive Virtual Hypervisors. Further, each Customer Virtual Machine in the Active Virtual Hypervisor is coupled to the second physical computing system by OSI Layer 2, prior to an OSI Layer 3 connection, for the transfer of data frames, each frame having a plurality of OSI Layer 2 tags permitting the segregation of each Virtual Machine independent of Layer 3 communication. An associated method of use is also provided.

56 Claims, 8 Drawing Sheets

(56) References Cited

U.S. PATENT DOCUMENTS

| | | |
|---|---|---|
| 2013/0188512 A1* | 7/2013 | Norris ................. H04L 12/4641 370/254 |
| 2013/0263118 A1 | 10/2013 | Kannan et al. |
| 2013/0297849 A1 | 11/2013 | Wagner |
| 2014/0310704 A1 | 10/2014 | Cantu |
| 2015/0358404 A1* | 12/2015 | Ayanam ................ G06F 9/4856 709/203 |

* cited by examiner

SYSTEM AND METHOD FOR NESTED HYPERVISORS AND LAYER 2 INTERCONNECTION

CROSS-REFERENCE TO RELATED APPLICATION

This application claims the benefit under 35 U.S.C. §119(e) of U.S. Provisional Application No. 62/126,310 filed Feb. 27, 2015 and entitled SYSTEM AND METHOD FOR NESTED HYPERVISORS AND LAYER 2 INTERCONNECTION, the disclosure of which is incorporated herein by reference.

FIELD OF THE INVENTION

The present invention relates generally to systems and methods for cloud computing environments with flexible network infrastructure, and more specifically to a computing environment provided by nested hypervisors and layer 2 interconnection providing private features sets with public cloud utilization.

BACKGROUND

Computer systems, and more specifically networked computer systems are a center point of modern society. Advances in production and miniaturization have permitted the production of increasingly faster processors and larger data storage.

Commerce, and indeed business in general is highly reliant on networked computer systems for nearly all aspects of business activity, such as but not limited to offering products for sale, maintaining account records, analyzing data, etc. . . . . Yet, the needs for resources may, and often does, change from time to time.

The changing needs for resources has been an issue. Initially, a physical hardware system would be established with a specific processor, memory, buss, peripherals and operating system. This specific system would then support a specific type of application run within the specific operating system. At a point in time when a new or different application was desired that required a different operating system, or perhaps even a different type of underlying hardware system a new physical system would then be assembled and provided. The original physical machine might or might not be recycled.

Virtual machines have helped ease this waste. Simply put, a hypervisor is a piece of computer firmware, hardware or software that creates and runs virtual machines. To the executing application or operating system, the virtual machine is essentially indistinguishable from a physical hardware machine, i.e., bare metal system. However, the hypervisor permits multiple virtual machines to exist on one bare metal system, and in many situations permits different types of virtual machines to co-exist.

The computing system on which a hypervisor is running one or more virtual machines is typically identified as the host machine or system. Each virtual machine is typically called a guest machine. The hypervisor presents each guest operating system with virtualized operating platform and manages the execution of the guest operating systems.

As the hypervisor is virtualizing the operating platform, the underlying bare metal system becomes less of an issue for if a change of the operating platform is desired or required, the hypervisor can provide a new virtualized operating platform.

For the environment of cloud computing where physical resources are shared among virtualized systems, the use of virtual machines can greatly improve the utilization and allocation of physical resources. In other words several virtual machines may be established by one hypervisor on one bare metal system. By way of the hypervisor, each virtual machine utilizes the resources of the underlying bare metal system when and as their applications require, so as one virtual system is idle another may be active. Of course if all virtual machines are attempting to be active at the same time the overall performance may be degraded if the combined resource requests are in excess of the physical resources of the bare metal system.

As each virtual machine exists and operates as if it were a physical system, in general these virtual machines must conform to the traditional tenants of networking and system interconnection.

The Open System Interconnection model, also referred to as the Open Source Interconnection model or more simply the OSI model, is a product of the Open System Interconnection effort at the International Organization for Standardization, and more specifically is a prescription characterizing and standardizing the functions of a communication system in terms of seven abstraction layers of concentric organization—Layer 1 the physical layer, Layer 2 the data link layer, Layer 3 the network layer, Layer 4 the transport layer, Layer 5 the session layer, Layer 6 the presentation layer, and Layer 7 the application layer.

Each layer is generally known as an N Layer. At each layer, two entities, i.e., N-entity peers, interact by means of the N protocol by transmitting protocol data units or "PDU". A Service Data Unit "SDU" is a specific unit of data that has been passed down from one layer to another, and which the lower layer has not yet encapsulated into a PDU. Moreover the PDU of any given layer, e.g. Layer N, is the SDU of the layer below, Layer N−1. In other words, the SDU is the payload of a given PDU.

Transfer of an SDU between layers is therefore a matter of encapsulation and is performed by the lower layer in adding appropriate headers and or footers to the SDU such that it becomes a PDU. These headers and or footers are part of the communication process permitting data to get from a source to a destination within any network.

Briefly, Layer 1, the physical layer defines the electrical and physical specifications of the device and the communication medium, e.g., copper cable, optical cable, wireless, etc. . . . . Layer 2, the data link layer, provides the functional and procedural means to transfer data from one entity to another, and to possibly correct errors that may occur in the physical layer. The data is arranged in logical sequences known as frames.

Layer 3 is the network layer and provides the functional and procedural means of transferring variable length data sequences from a source on one network to a destination host on a different network. Routers operate at this layer and make the Internet possible by properly handling the interconnections and handoffs between different networks. Layer 4 is the transport layer responsible for data transfer between end users and the reliability of a given link through flow control, segmentation/desegmentation and error control.

Layers 5, 6 and 7 as the Session, Presentation and Application layers are successively higher and closer to the user and subsequently further and further away from the physical layer. The greater the number of transfers between layers to accomplish any given task, the greater the complexity, latency and general opportunity for error.

Indeed within a typical local area network (LAN), wherein the systems are indeed part of the same network, the communication of data transfer is generally accomplished at the Layer 2 level. However, when joining one LAN to another, or to a wide area network (WAN), the addresses of the LAN may be meaningless or perhaps even duplicative of other addresses in other LANs and as such the translation to Layer 3 is the generally accepted method for maintaining harmony in communication.

While this is a viable option, and indeed the existence of the Internet demonstrates overall functionality, it does often come with overhead costs and burdens of complexity. For example, whereas a database within a LAN may be communicated with via Layer 2 and thereby enjoy enhanced integration as a networked component, accessing a similar database over Layer 3 requires Internet Protocol "IP" address translation, or other similar transformation which by it's vary nature requires the originating system to be configured for, and perhaps engage in appropriate measures for proper identification, and addressing of data to and from the remote database as would not be otherwise required with a LAN based database. For example the LAN systems may be on one network or VLAN and the remote database is part of another network or VLAN—the differences requiring at the very least a router to adjust and account for the differences in network identity and configuration.

These issues apply to virtual machines as supported by a hypervisor as well. Moreover, one or more LANs as established by a plurality of virtual machines interacting with each other and or with remote physical machines adhere to the same principles for data traffic and communication.

This can be a significant issue with respect to cloud computing environments as often times LANs are configured with default options—which is to say that LAN #1 for company A has settings that are identical to LAN #2 for company B because each was set up with the same default configurations. Although they may each have the same configurations, it is essential that each company receive the proper data traffic. In other words, although their configurations may be identical, it is essential that data traffic for each company be properly segregated. A failure in segregation may result in system inoperability, data loss, breach of confidentiality, etc. . . . .

Some attempts have been made to further extrapolate upon the virtualization provided by hypervisors. Indeed U.S. Pat. No. 8,484,639 to Huang, et al. presents an environment where a pseudo hypervisor is established on top of a first hypervisor. Virtual machines for each customer can then be segregated so that the virtual machines for company A are provided by pseudo hypervisor A while the virtual machines for company B are provided by pseudo hypervisor B.

As noted by Huang, "[b]y implementing a pseudo-hypervisor layer, the provider of virtualization software is able to effectuate management capabilities unavailable with a single level of virtualization due to the lack of visibility into the underlying virtual machines layer. The pseudo-hypervisor layer is visible to and is managed by the provider of virtualization software. Therefore, the provider of virtualization software can provision or migrate virtual machines among pseudo-hypervisors and within a single pseudo-hypervisor. By migrating applications to virtual machines controlled by a common pseudo-hypervisor, the provider of virtualization can ensure that applications are co-located on the same underlying hardware. Ensuring that applications are co-located on the same underlying hardware decreases input/output latency and increases bandwidth."

However this migration between pseudo hypervisors of the Huang system is a localized event—i.e., it is migration from one pseudo hypervisor within the Huang system to another pseudo hypervisor within the Huang system. Issues of overlapping configurations are apparently managed by the segregation to different pseudo hypervisors and the management of packet routing to these different pseudo hypervisors.

Moreover, although Huang clearly teaches co-location on underlying hardware to decrease input/output latency and increase bandwidth for those applications, Huang does not teach migration of virtual machines between pseudo hypervisors for high availability, maintenance or to achieve burst availability of a larger resource pool. There is also no mention or teaching in Huang of moving pseudo hypervisors in their entirety between hypervisors for these same reasons. And Huang does not address network management isolation or segmentation of the pseudo hypervisors.

Indeed, according to Huang, if company A and company B have identical configurations, segregation between them is only possible because the virtual machines of each are provided by different pseudo hypervisors, hypervisor A and hypervisor B. Any attempt to co-locate the virtual machines of A and B upon the same pseudo hypervisor would result in Huang system failure.

Moreover, although cloud computing does provide an improvement in many ways over previous options for expansion and contraction of resources to meet needs, it is not without it's own set of challenges and difficulties.

It is to innovations related to this subject matter that the claimed invention is generally directed.

SUMMARY

Embodiments of this invention provide a system and method for a multi-tenant datacenter with nested Virtual Hypervisors and Layer 2 cloud interconnection.

In particular, and by way of example only, according to one embodiment of the present invention, provided is a multi-tenant datacenter with nested hypervisors, including: at least one first physical computing system having at least one processor and at least one memory store adapted to provide a Customer Hypervisor providing a Customer Virtual Computing Environment with at least one Customer Virtual Machine (VM); at least a second and third physical computing systems each having at least one processor and memory store adapted to provide at least a First Hypervisor by the second Physical System and a Second Hypervisor by the third Physical System, each providing a First Virtual Computing Environment with a plurality of inactive Virtual Hypervisors nested therein; the multi tenant data center structured and arranged to activate a Virtual Hypervisor in the First Hypervisor and automatically migrate the at least one Customer VM from the Customer Hypervisor to the Active Virtual Hypervisor and evacuate the remaining inactive Virtual Hypervisors from the First Hypervisor to the Second Hypervisor; and wherein each Customer Virtual Machine in the Active Virtual Hypervisor is coupled to the second physical computing system by OSI Layer 2, prior to an OSI Layer 3 connection, for the transfer of data frames, each frame having a plurality of OSI Layer 2 tags permitting the segregation of each Virtual Machine independent of Layer 3 communication.

For another embodiment, provided is a multi-tenant datacenter with nested hypervisors, including: providing at least one first physical computing system having at least one processor and memory store adapted to provide at least one Hypervisor as an active Virtual Computing Environment with at least one first active Virtual Hypervisor nested therein, the active Virtual Hypervisor providing at least one first active Virtual Machine (VM); providing at least a second and third physical computing systems each having at least one processor and memory store adapted to provide a High Availability Hypervisor, each High Availability Hypervisor providing a High Availability Virtual Computing Environment with a plurality of inactive High Availability Virtual Hypervisors nested therein; and in response to a trigger: activating an inactive Virtual Hypervisor to provide a second active Virtual Hypervisor; migrating the at least one first active VM from the first active virtual Hypervisor to the second active Virtual Hypervisor; and evacuating the remaining inactive Virtual Hypervisors from the Hypervisor with the active second Virtual Hypervisor to at least one other hypervisor having inactive Virtual Hypervisors.

For still another embodiment, provided is a method for providing a multi-tenant datacenter with nested hypervisors, including: identifying a customer physical computing system having at least one processor and at least one memory store adapted to provide a Customer Hypervisor providing a Customer Virtual Computing Environment with at least one Customer Virtual Machine (VM); providing at least a second and third physical computing systems each having at least one processor and memory store adapted to provide a first level Hypervisor, each first level hypervisor providing a First Virtual Computing Environment with a plurality of inactive Virtual Hypervisors nested therein; and in response to a trigger: activating an inactive Virtual Hypervisor to provide an active Virtual Hypervisor; migrating the at least one customer VM from the Customer Hypervisor to the active Virtual Hypervisor; and evacuating the remaining inactive Virtual Hypervisors from the Hypervisor with the active Virtual Hypervisor to at least one other hypervisor having inactive Virtual Hypervisors.

Still further, for yet another embodiment, provided is a multi-tenant datacenter with nested hypervisors, including: at least a first and second physical computing system each having at least one processor and memory store adapted to provide at least a First Hypervisor by the first Physical System and a Second Hypervisor by the second Physical System, each providing a First Virtual Computing Environment with a plurality of inactive Virtual Hypervisors nested therein; the multi tenant data center structured and arranged to activate a Virtual Hypervisor on one of the at least two Hypervisors and automatically migrate at least one Customer VM from a Customer Hypervisor to the Active Virtual Hypervisor; and evacuate the remaining inactive Virtual Hypervisors from the Hypervisor supporting the Active Hypervisor to another of the at least two hypervisors supporting inactive Virtual Hypervisors; wherein each Customer Virtual Machine in the Active Virtual Hypervisor is coupled to the at least one physical computing system by OSI Layer 2, prior to an OSI Layer 3 connection, for the transfer of data frames, each frame having a plurality of OSI Layer 2 tags permitting the segregation of each Virtual Machine independent of Layer 3 communication.

And further still, for another embodiment, provided is a method for providing a multi-tenant datacenter with nested hypervisors, including: at least one first physical computing system having at least one processor and memory store adapted to provide at least one Hypervisor as an active Virtual Computing Environment with at least one active Virtual Hypervisor nested therein, the active Virtual Hypervisor providing at least one active Virtual Machine; at least a second and third physical computing systems each having at least one processor and memory store adapted provide a High Availability Hypervisor, each providing a High Availability Virtual Computing Environment with a plurality of inactive High Availability Virtual Hypervisors nested therein, the multi tenant data center structured and arranged to activate a High Availability Virtual Hypervisor on one of the at least two High Availability Hypervisors and automatically migrate the at least one active VM from the Active Virtual Hypervisor to the Active High Availability Virtual Hypervisor and evacuate the remaining inactive High Availability Virtual Hypervisors from the High Availability Hypervisor supporting the Active High Availability Hypervisor to another of the at least two High Availability hypervisors supporting inactive Virtual Hypervisors; wherein each Virtual Machine in the Active High Availability Virtual Hypervisor is coupled to the second physical computing system by OSI Layer 2, prior to an OSI Layer 3 connection, for the transfer of data frames, each frame having a plurality of OSI Layer 2 tags permitting the segregation of each Virtual Machine independent of Layer 3 communication.

BRIEF DESCRIPTION OF THE DRAWINGS

At least one system and method for a multi-tenant datacenter with flexible network infrastructure, and more specifically to a computing environment provided by nested hypervisors with Layer 2 interconnection providing private features sets with public cloud utilization.

DETAILED DESCRIPTION

Figure 1:
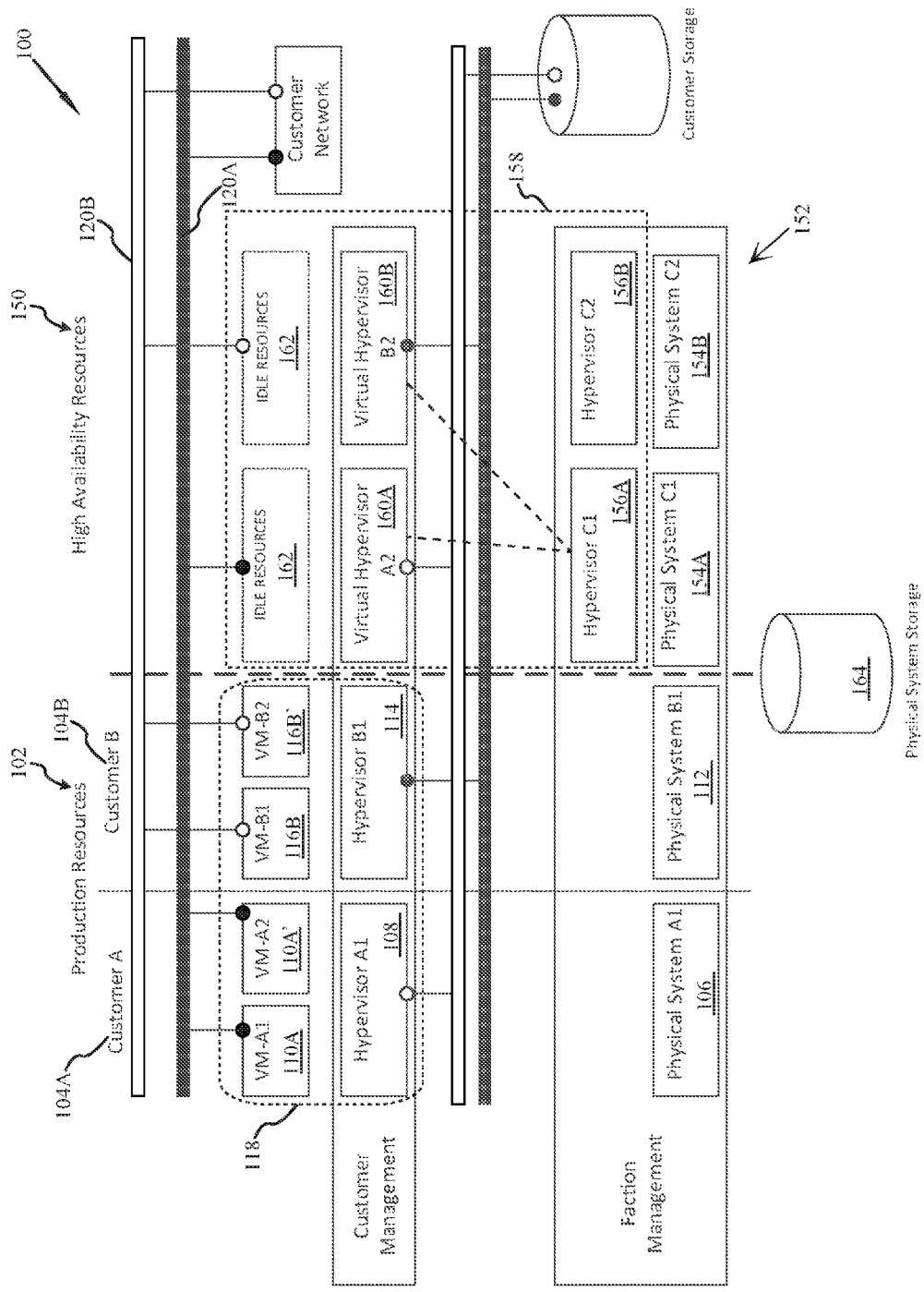
FIG. 1 illustrates a conceptual view of a partial virtualization environment for an embodiment of a multi tenant data center with nested hypervisors in accordance with at least one embodiment.

Before proceeding with the detailed description, it is to be appreciated that the present teaching is by way of example only, not by limitation. The concepts herein are not limited to use or application with a specific of system or method for a multi-tenant datacenter with flexible network infrastructure provided by nested hypervisors providing private feature sets with public cloud utilization, achieved in party with OSI Layer 2 interconnection distinct from OSI Layer 3 communication. Thus, although the instrumentalities described herein are for the convenience of explanation shown and described with respect to exemplary embodiments, it will be understood and appreciated that the principles herein may be applied equally in other types of systems and methods for multi-tenant datacenters.

This invention is described with respect to preferred embodiments in the following description with reference to the Figures, in which like numbers represent the same or similar elements. Further, with the respect to the numbering of the same or similar elements, it will be appreciated that the leading values identify the Figure in which the element is first identified and described, e.g., element 100 appears in FIG. 1.

Various embodiments presented herein are descriptive of apparatus, systems, articles of manufacturer, or the like for systems and methods involving nested hypervisors and Layer 2 interconnection. In some embodiments, an interface, application browser, window or the like may be provided that allows the user of the computing device to direct behavior of the computing device.

Moreover, some portions of the detailed description that follows are presented in terms of the manipulation and processing of data bits within a computer memory. The steps involved with such manipulation are those requiring the manipulation of physical quantities. Generally, though not necessarily, these quantities take the form of electrical or magnetic signals capable of being stored, transferred, combined, compared and otherwise manipulated. Those skilled in the art will appreciate that these signals are commonly referred to as bits, values, element numbers or other clearly identifiable components.

It is of course understood and appreciated that all of these terms are associated with appropriate physical quantities and are merely convenient labels applied to these physical quantifies. Moreover, it is appreciated that throughout the following description, the use of terms such as "processing" or "evaluating" or "receiving" or "outputting" or the like, refer to the action and processor of a computer system or similar electronic computing device that manipulates and transforms data represented as physical (electrical) quantities within the computer system's memories into other data similarly represented as physical quantities within the computer system's memories.

The present invention also relates to apparatus for performing the operations herein described. This apparatus may be specifically constructed for the required purposes as are further described below, or the apparatus may be one or more general purpose computer system selectively adapted or reconfigured by one or more computer programs stored in the computer upon computer readable storage medium suitable for storing electronic instructions.

Turning now to the drawings, and more specifically FIG. 1, illustrated is a high-level diagram of a multi-tenant datacenter with nested hypervisors and OSI Layer 2 cloud interconnection ("MTDC") 100 in accordance with certain embodiments. As shown for conceptualization, on the left MTDC 100 provides Production Resources 102 which are in active use by Customers 104 and on the right provides High Availability Resources 150, which, as will be discussed below, may transparently augment or assume support for the Production Resources 102. Each will now be further described.

With respect to FIG. 1, on the left are shown Customer A 104A and Customer B 104B. Of course additional Customers 104 may also exist, but for ease of discussion and illustration two are shown for this exemplary embodiment.

As indicated, for Customer A 104A, Physical System A1 106 is provided upon which is established a Customer A hypervisor shown as Hypervisor A1 108, supporting one or more Customer A virtual machines 110, e.g., virtual machines VM-A1 110A and VM-A2 110A'. Likewise, for Customer B 104B, a Physical System B1 112 is provided upon which established a Customer B hypervisor shown is Hypervisor B1 114, supporting one or more Customer B virtual machines 116, e.g. virtual machines VM-B1 116B and VM-B2 116B'.

Moreover, Hypervisor A1 108 and Hypervisor B1 114 are each understood and appreciated to be providing the initial Customer Virtual Computing Environment 118 with at least one Customer Virtual Machine 110, 116. This initial Customer Virtual Computing Environment may also be viewed as the Initial Virtual Computing Environment.

For ease of illustration and discussion, Physical System A1 106 may be referred to as a customer physical computing system or a First Physical Computer System. Although Physical System A1 106 may indeed be hardware provided by a customer, the label "customer" as used herein is not intended as a limitation that such is always the case. Indeed Physical System A1 106 may indeed be a component of MTDC 100 upon which Customer A 104A has been established.

Moreover, for at least one embodiment MTDC 100 includes at least one first physical computing system (e.g. 106) having at least one processor and at least one memory store adapted to provide a customer hypervisor (e.g. 108) providing a virtual customer computing environment 118 with at least one client virtual machine (e.g. 110, 116).

As is also shown, on the far right are one or more customer networks 120, e.g. network 120A for Customer A 104A and network 120B for Customer B 104B. These customer networks 120 are coupled at OSI Layer 2 to each of their production resources as shown on the left. In other words, the outside network of Customer A 104A is coupled at Layer 2 to the production resources for Customer A 104A, i.e., virtual machines VM-A1 110A and VM-A2 110' as shown, and Customer B 104B is coupled at Layer 2 to the production resources for Customer B 104B, i.e., virtual machines VM-B1 116B and VM-B2 116B'.

For at least one embodiment this Layer 2 interconnection is achieved in accordance with the systems and methods as set forth in U.S. patent application Ser. No. 13/356,555 and continuing U.S. patent application Ser. No. 14/621,320 each entitled "SYSTEM AND METHOD FOR A MULTI-TENANT DATACENTER WITH LAYER 2 CLOUD INTERCONNECTION" and each incorporated herein by reference.

As the coupling of the customer networks to their respective networks is performed at OSI Layer 2 these networks are fully segregated and each customer enjoys the ability for complete control of software defined networking for his or her respective network.

As the coupling at Layer 2 for the transmission of frames occurs before communication at Layer 3, issues of overlaps with respect to both IP address space and VLANs are moot. To be clear, tagging for segregation is not performed at Layer 3 with packets or at Layer 3 by tagging Layer 2 Frames within the Packets. Segregation tagging is performed at Layer 2 distinctly apart from Layer 3 communications and frames are segregated and transferred based on their tags at Layer 2.

This is of courses not to say that Layer 3 communication in the form of IP routing does not occur. It does. However, because the Frames have been tagged using Layer 2 Tags and segregated based on these Layer 2 Tags prior to the issue of Layer 3 packet routing, the segregation has already occurred and issues of IP address range and or VLAN overlap are rendered moot.

Moreover, because of this Layer 2 tagging, each Customer enjoys the ability to impose whatever software defined networking they desire for their apparent network—and this includes of course operating with the default settings which in other settings would almost certainly generate severe problems from IP address range overlap and or VLAN overlap.

In addition, not only does each Customer 104 enjoy the ability to impose their own software defined networking, that choice and the implementation thereof from the Customer's perspective is achieved transparently. The Customer does not require additional hardware or software, to re-tag or re-encapsulate their Layer 3 packets. This is tremendous, for integration of a new Customer 104, network additions for an existing Customer 104, and migration out of MTDC 100 for a Customer 104 can be achieved efficiently and transparently without requiring the Customer 104 to change his or her software defined network implantation.

This advantage may be further understood and appreciated with the following description of traffic flow as would exist for at least one embodiment regarding the initial state of Production Resources 102 shown in FIG. 1. A virtual machine, i.e. 110A sends the traffic out the vmnic (virtual machine network interface card) attached to the virtual machine 110A and to the virtual switch. The physical hypervisor A1 108 receives the traffic from the virtual machine 110A via the virtual switch and forwards the traffic to a bridge device (a virtual machine that takes the vxlan traffic bound for an 802.1q. (dot1q) vlan in on one interface and forwards it out on a second interface without the vxlan header. The traffic is bidirectional).

Once through the bridge device, the traffic is then encapsulated utilizing a TRILL Fabric (a mesh-like connection of switches utilizing the TRILL protocol), such as Brocade's VCS Fabric or Cisco's FabricPath and a Fine Grained Label is applied. The fine grained label (FGL) is effectively a secondary VLAN tag added into the "vlan info" header space. The traffic is then forwarded through the TRILL Fabric to the physical port which has the physical equipment connected. The FGL is then altered to remove the secondary tag and the traffic is passed through to the Physical device, i.e. Physical System A1 106 as dot1q traffic. Moreover the flow of data may be shown as:

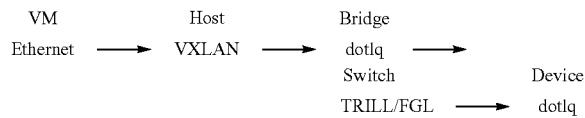

Returning to FIG. 1, on the right is an embodiment of at least one nested hypervisor virtualization environment NHVE 152, further identified by the label High Availability Resources 150. More specifically NHVE 152 is an advantageous component of MTDC 100.

As shown, for at least one embodiment of NHVE 152, two or more Physical Systems 154, such as Physical System C1 154A and Physical System C2 154B are provided and each supports one first level Hypervisor, i.e., Hypervisor C1 156A in the caser of Physical System C1 154A and Hypervisor C2 156B in the caser of Physical System C1 154B. Of course additional physical systems providing additional first level Hypervisors 156 may also be provided. These first level Hypervisors, i.e., Hypervisor C1 156A and Hypervisor C2 156B initially provides a First Virtual Computing Environment 158 which may also be appreciated as a High Availability Virtual Computing Environment. Within this First Virtual Computing Environment 158, Hypervisor C1 156A provides a plurality of inactive Virtual Hypervisors 160, i.e., inactive Virtual Hypervisor A2 160A and inactive Virtual Hypervisor B2 160B (VH-A2 and VH-B2). Each of the Virtual Hypervisors 160 is configured as if it were a normal non-Virtual Hypervisor, which is to say that each Virtual Hypervisor 160 provides a virtualized operating platform that for the moment has idle resources, e.g. 162.

The distinction between the first/customer physical computing system and the second physical computing systems is important. Specifically, it is to be noted that the first physical computing system—i.e. Physical System A1 106 is a typical system—a bare metal system having at least one processor and at least one memory store adapted to provide a Customer Hypervisor (Hypervisor A1 108) which in turn is supporting a plurality of active Customer Virtual Machines (VM-A1 110A and VM-A2 110A').

In contrast, each second physical system 154 having at least one processor and memory store is adapted to provide a first level Hypervisors 156. Each of these first level Hypervisors 156 provides a First Virtual Computing Environment 158 with a plurality of inactive Virtual Hypervisors 160 nested therein. As each of the inactive Virtual Hypervisors 160 appears as a normal Hypervisor, each may be provisioned to support one or more Virtual Machines at some point in the future, or may even be provisioned now or later, with one or more inactive Virtual Machines which may be activated to assume the role of the original active Customer Virtual Machines (i.e., VM-A1 110A and VM-A2 110A').

It is specifically noted that for at least one embodiment, each Physical System C1 154A, C2 154B, etc. which in turn is providing the first level Hypervisor C1 156A, C2 156B, etc. . . . , may be a different type of physical system, which is to say that each may be of a different computer type, generation, and version of hardware. Because NHVE 152 is essentially a virtualized environment, the use of different systems is essentially immaterial for through the first level Hypervisors 156 providing Virtual Hypervisors 160, the physical bare mettle systems providing the each Physical System 154 are essentially cooperatively providing a resource pool providing idle resources 162 as high availability backup. This advantageously permits older systems to be used longer, and thus a longer return on investment, longer service life, reduced number of systems submitted for recycling and many other advantages.

To briefly summarize, for at least one embodiment of MTDC 100 the second Physical Systems C1 154A and C2 154B, etc. . . . , providing a Hypervisor C1 156A and Hypervisor C2 156B, etc. . . . , providing First Virtual Computing Environment 158 with the plurality of inactive Virtual Hypervisors 160 nested therein, are provided by a physical bare metal systems, each of which may be distinctly different. More specifically, each bare metal system may be of a different computer type, generation, and version of hardware.

For at least one embodiment VH-A2 160A has been configured to mirror Hypervisor A1 108 and VH-B2 160B has been configured to mirror Hypervisor B1 114. In other words each inactive Virtual Hypervisor 160 may be pre-configured for a generic hypervisor used by an existing Customer 104 or customized as a backup to a specific hypervisor for a specific Customer 104. Moreover, the Virtualized Hypervisors 160 are providing high availability backup for each of the active Hypervisors shown on the left.

As each Virtual Hypervisor 160 is at the moment idle, it is understood and appreciated that for at least one embodiment, a large plurality of Virtual Hypervisors 160 may be nested upon each first level Hypervisor 156. In other words, as the idle Virtual Hypervisors 160 are not actually utilizing resources, a greater number of Virtual Hypervisors 160 may be instantiated then would be desirable if the Virtual Hypervisors 160 were truly active in supporting active virtual machines. As such, the physical system storage 164 of MTDC 100 can easily accommodate the data records for the Virtual Hypervisors 160, as well as other MTDC 100 management data and record keeping.

Returning to FIG. 1, the embodiment as shown has been structured and arranged to provide high availability of the production resources 102 for Customer A 104 and Customer B 104. In other words, MTDC 100 is providing high availability of these production resources so that Customers 104 enjoy substantially continuous minimum service level availability.

In addition, MTDC 100 may also provide not only minimum service level availability, but also greater availability should a situation arise where greater resource availability is desired then is otherwise provided by Physical System A1 106 supporting Hypervisor A1 108 or by Server B1 112 supporting Hypervisor B1 114.

Further still, MTDC 100 may also provide temporary migration of virtual machines, e.g. Virtual Machines 110A and/or 110A', without disruption of service so as to permit maintenance on one or more physical servers, i.e., the bare metal systems.

For at least one embodiment, the migration operation is performed automatically in response to a trigger, such as but not limited to a failure of the first physical computing system, e.g., Physical System A1 106, a request for high availability of resources at a level greater then those provided by the first physical computing system, e.g., Physical System A1 106, an indication of maintenance for the first physical computing system, e.g., Physical System A1 106, or other event. In addition, for at least one embodiment this migration is performed so that it is substantially transparent to the customer 104, e.g., Customer A 104A and or the users of the customer's network.

Figure 2:
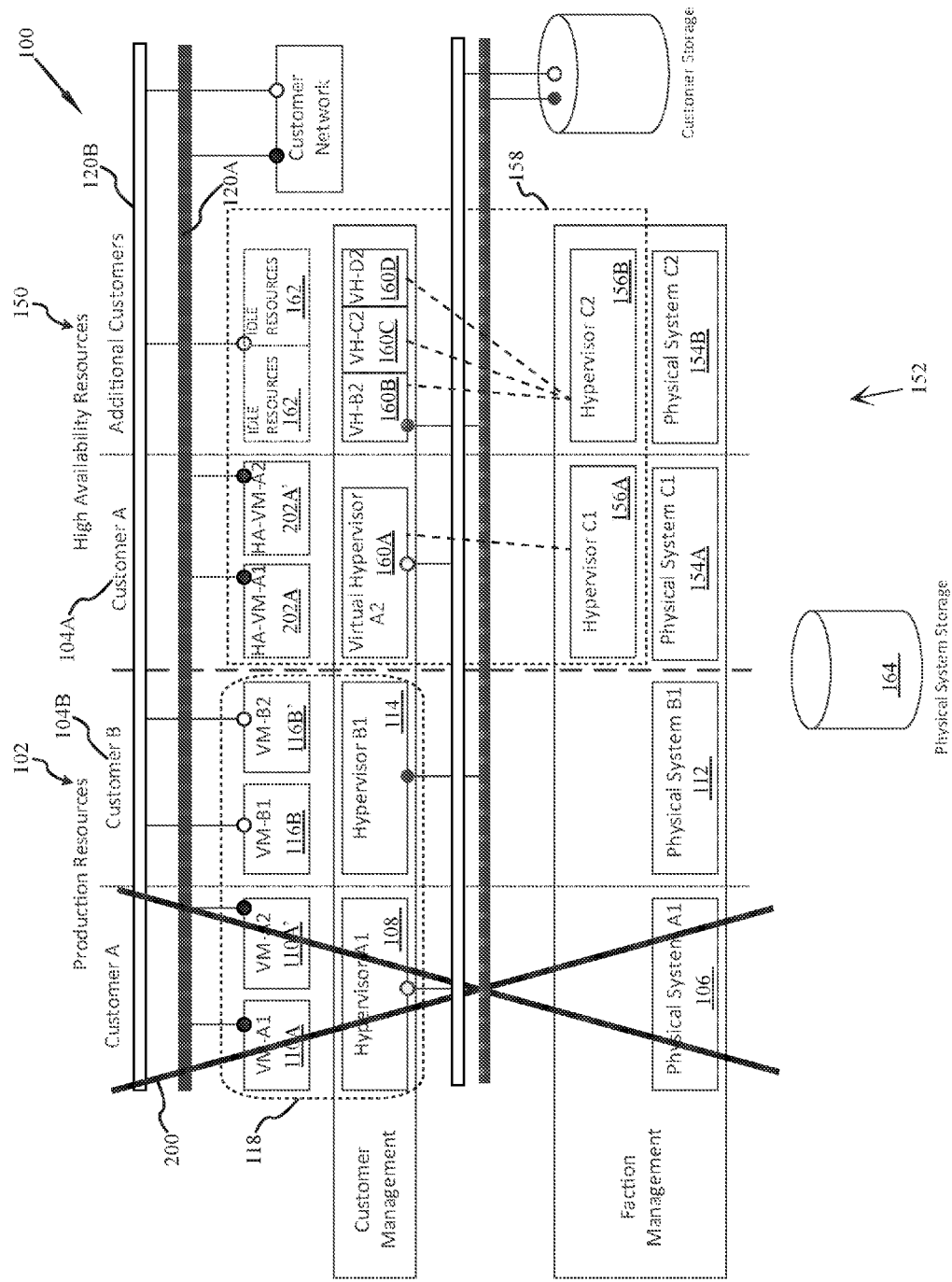
FIG. 2 illustrates the migration within the multi tenant data center of FIG. 1 upon a failover event according to at least one embodiment.

As is shown in FIG. 2, the Production Resources 102 for Customer A 104A have been crossed out by X 200 so as to indicate that they are not available as shown in FIG. 1. The situation may occur for a number of reasons, such as but not limited to a hardware failure of Physical System A1 106, a need for hardware maintenance on Physical System A1 106, a need for additional resources beyond those of Physical System A1 106, or some other event.

In this case, the virtual machines VM-A1 110A and VM-A2 110A' have been migrated from the customer Hypervisor A1 108 to Virtual Hypervisor A2 160A where they are now shown as HA-VM-A 1 202A and HA-VM-A2 202A'. As Virtual Hypervisor A2 160A was pre-configured as a mirror for Hypervisor A1 108, this migration is quickly and easily performed. Indeed, as a further measure, from time to time, VM-A1 110A and VM-A2 110A' may have been backed up to Virtual Hypervisor A2 160A, however as this backup was performed without activating the backups HA-VM-A1 and HA-VM-A2, they continue as idle resources until such time as they are needed.

For embodiments where idle copies of HA-VM-A1 202A and HA-VM-A2 202A' were established upon Virtual Hypervisor A2 160A, upon the drop of Physical System A1 106, only an incremental update for the most recent changes occurs in order to bring the backed up versions of HA-VM-A1 202A and HA-VM-A2 202A' current and active as the now operating Virtual Machines HA-VM-A1 202A and HA-VM-A2 202A'.

Moreover, MTDC 100 advantageously permits the migration of Virtual Machines from a traditional Hypervisor, i.e. Hypervisor A1 108, to a Virtual Hypervisor 160, and in this exemplary case specifically Virtual Hypervisor 160A. In addition, and for at least one other embodiment, the traditional Hypervisor may also be migrated and established as a nested Virtual Hypervisor. Of course, as used herein, the term "migrated" is understood and appreciated to mean a new instance is created and installed, such that it appears as if the Virtual Machine, Hypervisor or Virtual Hypervisor has migrated from one location to another—the data is of course copied, as is the nature of data. Truly it is more a matter of appearance as to where the active Virtual Machine—it was there, now it is here, as if it has "migrated." This apparent migration is the result of the underlying configuration data being propagated to the new Virtual Hypervisor.

In at least one embodiment, in response to the migration of VM-A1 110A and VM-A2 110A' from Hypervisor A1 108 to Virtual Hypervisor A2 160A the remaining idle Virtual Hypervisors, i.e. Virtual Hypervisor B2 160B, etc. . . . , are also migrated from Hypervisor C1 156A to Hypervisor C2 156B. As Hypervisor C2 156B is providing other idle Virtual Hypervisors 160, the migration of the still idle Virtual Hypervisors, i.e. Virtual Hypervisors B2 160B, C2 160C, D2 160D, etc. . . . , to Hypervisor C2 156B does not impose a significant resource drain upon Hypervisor C2 156B or underlying Physical System C2 154B.

With the idle Virtual Hypervisors now evacuated from Hypervisor C1 156A, Virtual Hypervisor A2 160A with now active virtual machines HA-VM-A1 202A and HA-VM-A2 202A' now enjoys the high availability of resources directly from Physical System C1 154A through Hypervisor C1 156A.

As noted above, the bare metal systems providing each Physical System 154 may be of different types, configurations and/or ages. For support of the first level Hypervisors 156 providing virtualized nested Hypervisors 160 the true nature of the physical bare metal system is of little concern, for it is the overall virtualized resource pool of possible resources that is desired for backup. When a migration is actually desired and performed, it is certainly well within reason for the migration to occur from the client Physical System 106 to a Physical System 154 within the NHVE 152 that is equal or superior in terms of actual resources. Moreover, faster and/or newer Physical System 154 may be selected at the time of actual migration, with the older Physical Systems 154 serving to support the additional migrated, and still inactive, virtual hypervisors 160.

Moreover, for at least one embodiment MTDC 100 includes at least one physical computing system 154A and at least one second physical computing system 154B each having at least one processor and memory store adapted to provide at least a First Hypervisor 156A by the first Physical System 154A and a Second Hypervisor 156B by the second Physical System 154B, each providing a First Virtual Computing Environment 158 with a plurality of inactive Virtual Hypervisors 160 nested therein; the MTDC 100 structured and arranged to activate a Virtual Hypervisor 160 in the First Hypervisor 156A and automatically migrate the at least one Customer VM 110/116 from the Customer Hypervisor 108/114 to the Active Virtual Hypervisor 160A and evacuate the remaining inactive Virtual Hypervisors 160B-160N from the First Hypervisor 156A to the Second Hypervisor 156B.

Again, as the coupling between Customer Network A 120A and the production resources 102 for customer network A 120A is established at OSI Layer 2 with Layer 2 tags in frames, the HA-VM-A1 202A and HA-VM-A2 202A' are still segregated within MTDC 100 from all other virtual machines and issues of IP overlap and VLAN overlap which would be significant with coupling and communication performed at Layer 3, are effectively moot.

Moreover, MTDC 100 and the use of nested Virtual Hypervisors 160 permits each Customer 104 to be advantageously provided with guaranteed high availability resources for events such as failover or the need for increased resources. At the same time, as the nested Virtual Hypervisors 160 are idle until needed, the number of actual physical computing machines 154, i.e., bare metal systems supporting the plurality of hypervisors 156 supporting the idle nested Virtual Hypervisors 160 is advantageously reduced.

For example, as opposed to a physical bare metal system supporting a hypervisor supporting ten (10) active virtual machines, a hypervisor, i.e. Hypervisor C1 156 may support hundreds if not thousands of idle Virtual Hypervisors 160, each of which can be activated to support migrated virtual machines. The evacuated inactive Virtual Hypervisors 160 removed from the hypervisor, i.e. Hypervisor C1 156A, with a now active Virtual Hypervisor are simply nested on yet another hypervisor, i.e. Hypervisor C2 156B, which may already have one or more inactive Virtual Hypervisors 160.

Of course, the migration of the virtual machines VM-A1 110A and VM-A2 110A' from Hypervisor A1 108 to Virtual Hypervisor A2 160A may be reversed. In other words once Physical System A1 106 has been upgraded, replaced or otherwise restored to operation and Hypervisor A1 108 is re-established, HA-VM-A1 202A and HA-VM-A2 202A' may be migrated back to the original configuration of VM-A1 110A and VM-A2 110A' if so desired. Such reverse migration may be desired for a variety of reasons, including but not limited to a completion of the maintenance of the physical server, e.g., Physical System A1 106, when the higher availability of resources is no longer required, or for other reasons such as perhaps cost and/or resource allocation.

To summarize, for at least one embodiment, MTDC 100 is provided as multi-tenant datacenter with nested hypervisors, including: at least a first and second physical computing system 154A and 154B each having at least one processor and memory store adapted to provide at least a First Hypervisor 156A by the first Physical System 154A and a Second Hypervisor 156B by the second Physical System 154B, each providing a First Virtual Computing Environment 158 with a plurality of inactive Virtual Hypervisors 160 nested therein the MTDC 100 structured and arranged to activate a Virtual Hypervisor 160A on one of the at least two Hypervisors 156 and automatically migrate at least one Customer VM from a Customer Hypervisor 108 to the Active Virtual Hypervisor 160A, and evacuate the remaining inactive Virtual Hypervisors 160B etc. from the Hypervisor 156A supporting the Active Hypervisor 160A to another of the at least two Hypervisors 156B supporting inactive Virtual Hypervisors 160; wherein each Customer VM in the Active Virtual Hypervisor 160A is coupled to the at least one physical computing system 154 by OSI Layer 2, prior to an OSI Layer 3 connection, for the transfer of data frames, each frame having a plurality of OSI Layer 2 tags permitting the segregation of each Virtual Machine independent of Layer 3 communication.

With respect to FIGS. 1 and 2, the embodiment as shown may be considered as a partial virtualization environment within MTDC 100. Moreover, although the nested Virtual Hypervisors are shown with respect to the right side of MTDC 100 in FIGS. 1 and 2, (e.g., Physical System C1—Hypervisor C1—Virtual Hypervisor A1—Idle Resources), the left side of each figure shows a traditional configuration, (e.g., Physical System A1 106—Hypervisor A1 108—VM-A1 110A & VM-A2 110A').

Figure 3:
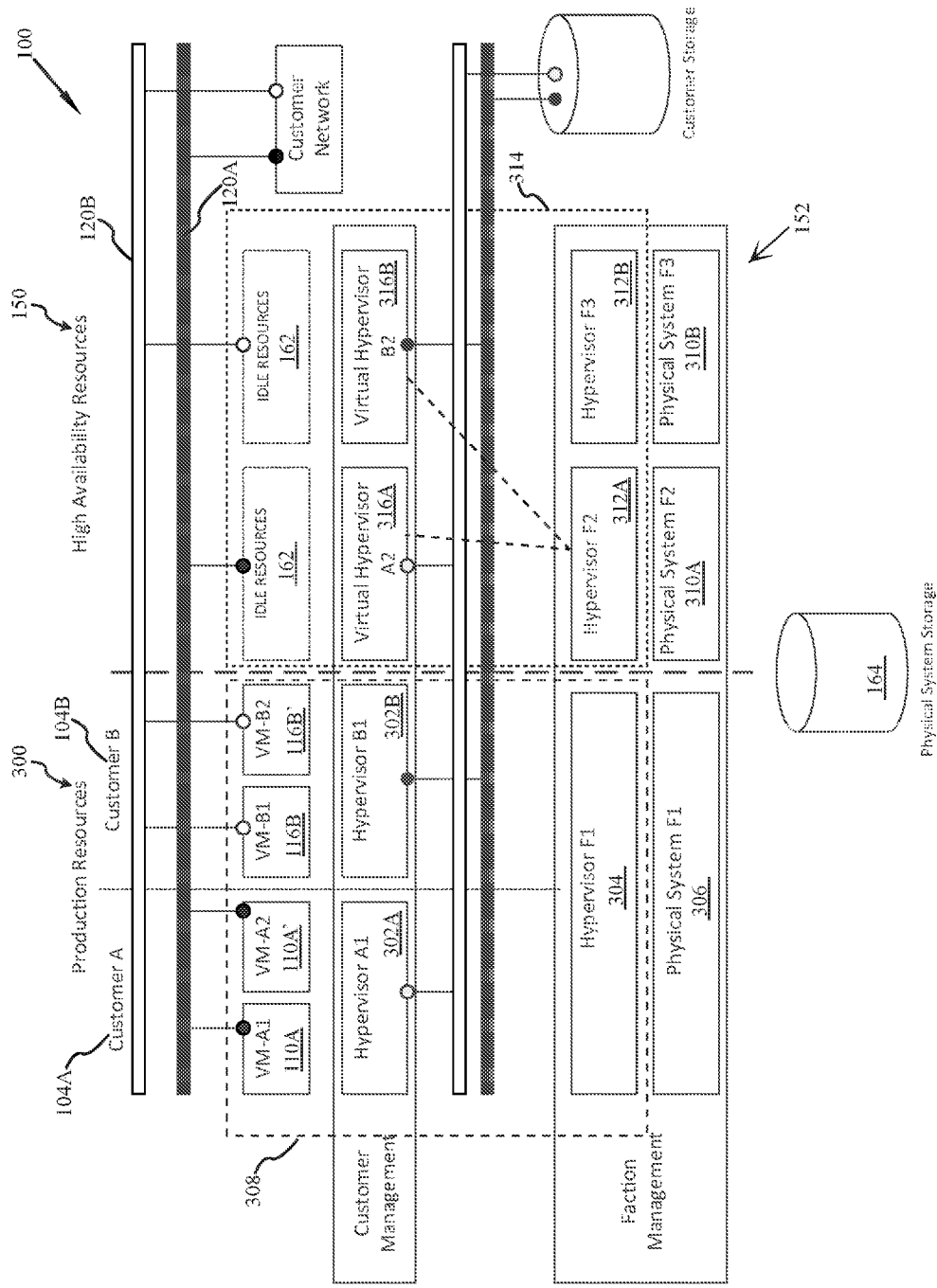
FIG. 3 illustrates a conceptual view of a full virtualization environment for an embodiment of a multi tenant data center with nested hypervisors in accordance with at least one embodiment.
Figure 4:
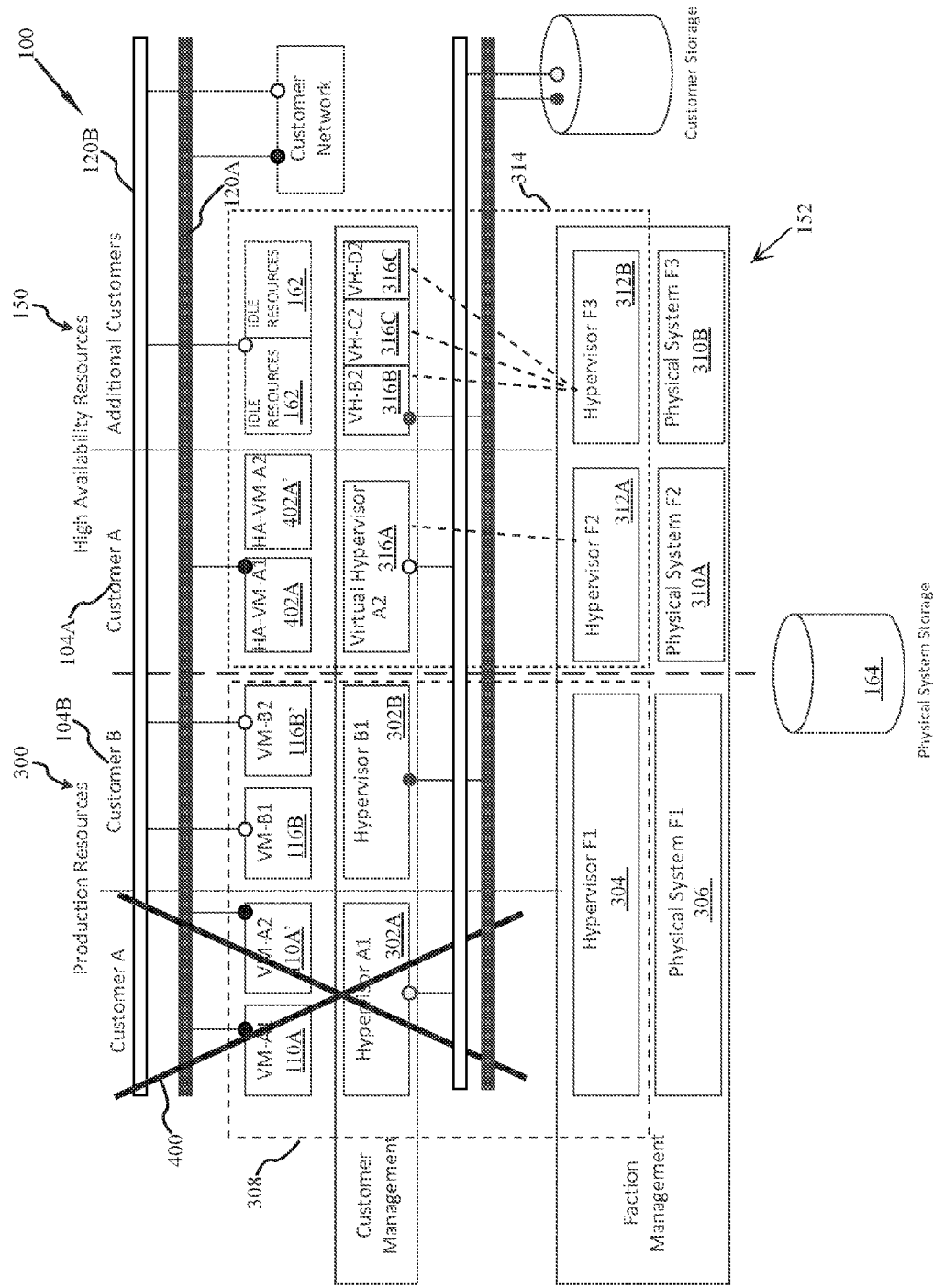
FIG. 4 illustrates the migration within the multi tenant data center of FIG. 3 upon a failover event according to at least one embodiment.

FIGS. 3 and 4 further illustrate yet another embodiment wherein MTDC 100 is a fully virtualized environment wherein all Customer Virtual Machines 110 & 116 are supported by Virtual Hypervisors nested upon Hypervisors.

More specifically, FIG. 3 presents yet another embodiment which is a further adaptation of that shown in FIGS. 1 and 2. Here, from the outset the production resources 300 for each Customer 104 are provided by active Virtual Hypervisors 302 (VH-A1 302A & VH-B1 302B) nested in at least one Hypervisor 304 (H-F1) in turn supported by at least one first physical computing system, i.e., bare metal systems (Physical System F1 306).

Moreover, for at least one embodiment MTDC 100 includes at least one first physical computing system 306 having at least one processor and memory store adapted to provide at least one Hypervisor 304 having an active Virtual Computing Environment 308 with at least one active Virtual Hypervisor 302 nested therein, the active Virtual Hypervisor 302 providing at least one active Virtual Machine, i.e., VM-A1 110A and VM-A2 110A'.

As in FIGS. 1 & 2, for this alternative embodiment MTDC 100 also provides High Availability Resources 150 in the form of at least one nested hypervisor virtualization environment NHVE 152.

Moreover, MTDC 100 further provides at two additional physical computing systems 310 having at least one processor and memory store adapted to provide a High Availability Hypervisor 312, each providing a High Availability Virtual Computing Environment 314 with a plurality of inactive High Availability Virtual Hypervisors 316 nested therein.

More specifically, at least a second and third physical computing system, such as Physical System F2 310A and Physical System F3 310B, each supporting a high availability Hypervisor 312, i.e., high availability Hypervisors F2 312A and F3 312B respectively. Hypervisor F2 312A in turn is supporting a plurality of inactive Virtual Hypervisors 316, i.e., inactive Virtual Hypervisor A2 and inactive Virtual Hypervisor B2 (VH-A2 316A and VH-B2 316B). Each of the Virtual Hypervisors is configured as if it were a normal non-Virtual Hypervisor, which is to say that each Virtual Hypervisor 316 provides a virtualized operating platform with idle resources. Hypervisor F3 312B is likewise configured to support a plurality of inactive Virtual Hypervisors 316.

As noted above with respect to the partially virtualized embodiment of MTDC 100, it is again noted that for at least one embodiment, each Physical System F2 310A, F3 310B, etc., which in turn is providing the first level/high availability Hypervisors 312, i.e. F1 312A, F2 312B, etc. . . . , may be a different type of physical system, which is to say that each may be of a different computer type, generation, and version of hardware. Because NHVE 152 is essentially a virtualized environment, the use of different systems is essentially immaterial for through the first level/high availability Hypervisors 312 providing Virtual Hypervisors 316, the physical bare mettle systems providing the each Physical System 310 are essentially cooperatively providing a resource pool providing idle resources 162 as high availability backup. This advantageously permits older systems to be used longer, and thus a longer return on investment, longer service life, reduced number of systems submitted for recycling and many other advantages.

To summarize, for at least one embodiment, within MTDC 100 the first physical computing system (Physical System F1 306) and each second and third physical computing system (Physical System F2 310A, Physical System F3 310B, etc. . . . ) are provided by a physical bare metal systems, each of which may be distinctly different. More specifically, each bare metal system may be of a different computer type, generation, and version of hardware. plurality of physical bare metal systems operating collectively. In addition, for at least one embodiment, the plurality of physical bare metal systems are a mixture of different computer types, generations, and versions of hardware, combined as a new virtualized computing resource provided as at least the production resource active Hypervisor F1 304 and the high availability Hypervisors F2 312A and F3 312B.

The number of active Virtual Hypervisors supported by each hypervisor is of course variable. For certain customers this initial arrangement may be 1-1, i.e., one active Virtual Hypervisor 302 nested to one Hypervisor F1 304 supported by one or more physical computing systems (Physical System F1 306). For other customers multiple active Virtual Hypervisors (VH-A2 316A and VH-B2 316B) may be nested within one Hypervisor (Hypervisor F1 304) so long as the resource needs are not over taxed. Such co-nesting may permit greater resource allocation and thereby permit more efficient use of resources.

The nested inactive Virtual Hypervisors 316 are as discussed above. In short, the second and third physical computing systems 310 each support a base high availability Hypervisor 312, i.e., Hypervisor F2 312A and Hypervisor F3 312B. Each base high availability Hypervisor 312 in turn supports nested inactive Virtual hypervisors 316. As they are inactive, there may be hundreds if not thousands of inactive Virtual Hypervisors 316 provisioned within MTDC 100 by one or more base Hypervisors such as F2 312A and F3 312B. These nested inactive Virtual Hypervisors 316 may be activated at any time and the remaining inactive Virtual Hypervisors 316 evacuated to other base Hypervisors 312 in response to a trigger, such as but not limited to a failure or a request for greater level of resource availability then is currently being provided.

And again, the use of OSI Layer 2 tagging as set forth by U.S. patent application Ser. No. 13/356,555 and continuing U.S. patent application Ser. No. 14/621,320 permits each customer to control software defined networking within the active Virtual Hypervisor.

Indeed, not only does each Customer 104 enjoy the ability to impose their own software defined networking, that choice and the implementation thereof from the Customer's perspective is achieved transparently. The Customer does not require additional hardware or software, to re-tag or re-encapsulate their Layer 3 packets. This is an important advantage, for integration of a new Customer 104, network additions for an existing Customer 104, and migration out of MTDC 100 for a Customer 104 can be achieved efficiently and transparently without requiring the Customer 104 to change his or her software defined network implantation.

Returning to FIG. 3, the embodiment as shown has been structured and arranged to provide high availability of the production resources for Customer A 104A and Customer B 104B. In other words, MTDC 100 is providing high availability of these production resources so that Customers 104 enjoy substantially continuous minimum service level availability.

In addition, MTDC 100 may also provide not only minimum service level availability, but also greater availability should a situation arise where greater resource availability is desired then is otherwise provided by Physical System F1 306 supporting Hypervisor F1 304, which in turn is supporting Virtual Hypervisors (VH-A2 316A and VH-B2 316B).

Further still, MTDC 100 may also provide temporary migration of virtual machines, e.g. Virtual Machines 110A and/or 110A', without disruption of service so as to permit maintenance on one or more physical servers, i.e., the bare metal systems.

For at least one embodiment, the migration operation is performed automatically in response to a trigger, such as but not limited to a failure of the first physical computing system, e.g., Physical System F1 306, a request for high availability of resources at a level greater then those provided by the first physical computing system, e.g., Physical System F1 306, an indication of maintenance for the first physical computing system, e.g., Physical System F1 306, or other event. In addition, for at least one embodiment this migration is performed so that it is substantially transparent to the customer 104, e.g., Customer A 104A and or the users of the customer's network.

As with FIG. 2, in FIG. 4, the Production Resources 300 for Customer A 104A have been crossed out by X 400 so as to indicate that they are not available as shown in FIG. 3. The situation may occur for a number of reasons, such as but not limited to a hardware failure of Physical System F1 306, a need for hardware maintenance on Physical System F1 306, a need for additional resources beyond those of Physical System F1 306, or some other event.

In this case, the virtual machines VM-A1 110A and VM-A2 110A' have been migrated from Virtual Hypervisor A1 302A to Virtual Hypervisor A2 316A where they are now shown as HA-VM-A1 402A and HA-VM-A2 402A'. As Virtual Hypervisor A2 316A was pre-configured as a mirror for Virtual Hypervisor A1 302A, this migration is quickly and easily performed. Indeed, as a further measure, from time to time, VM-A1 110A and VM-A2 110A' may have been backed up to Virtual Hypervisor A2 316A, however as this backup was performed without activating the backups VM-A 1' and HA-VM-A2, they continue as idle resources until such time as they are needed.

For embodiments where idle copies of HA-VM-A1 402A and HA-VM-A2 402A' were also established upon Virtual Hypervisor A2 316A, upon the drop of Physical System F1 306, only an incremental update for the most recent changes occurs in order to bring the backed up versions of HA-VM-A1 402A and HA-VM-A2 402A' current and active as the now operating Virtual Machines HA-VM-A1 402A and HA-VM-A2 402A'.

Moreover, MTDC 100 advantageously permits the migration of virtual machines from a Virtual Hypervisor to a Virtual Hypervisor, i.e. VH-A1 302A to VH-A2 316A. In addition, and for at least one other embodiment, the initial Virtual Hypervisor may also be migrated and established as a nested Virtual Hypervisor.

In at least one embodiment, in response to the migration of VM-A1 110A and VM-A2 110A' from Virtual Hypervisor A1 302A to Virtual Hypervisor A2 316A the remaining idle Virtual Hypervisors, i.e. Virtual Hypervisor B2 316B, etc. . . . , are also migrated from Hypervisor F2 312A to Hypervisor F3 312B. As Hypervisor F3 312B is providing other idle Virtual Hypervisors 316, the migration of the still idle Virtual Hypervisors, i.e. Virtual Hypervisor B2 316B, etc. . . . , to Hypervisor F3 316B does not impose a significant resource drain upon hypervisor F3 312B or underlying physical system. The underlying physical system may be the same physical System F2 310A, or a different physical System F3 310B. Again, Physical System F3 310B may be provided by the aggregation of several physical systems.

With the idle Virtual Hypervisors now evacuated from Hypervisor F2 312A, the Virtual Hypervisor A2 316A with now active virtual machines HA-VM-A1 402A and HA-VM-A2 402A' now enjoys the high availability of resources directly from Physical System F2 310 through Hypervisor F2 312A.

To summarize, for at least one embodiment of MTDC 100 is structured and arranged to activate a High Availability Virtual Hypervisor 316 on one of the at least two High Availability Hypervisors 312 and automatically migrate the at least one active VM 110A from the Active Virtual Hypervisor 302 to the Active High Availability Virtual Hypervisor 316A and evacuate the remaining inactive High Availability Virtual Hypervisors 316B from the High Availability Hypervisor 312 supporting the Active High Availability Hypervisor 316A to another of the at least two High Availability Hypervisors 312 supporting inactive Virtual Hypervisors 316. Further, each Virtual Machine 110 in the Active High Availability Virtual Hypervisor 316A is coupled to the second physical computing system 310 by OSI Layer 2, prior to an OSI Layer 3 connection, for the transfer of data frames, each frame having a plurality of OSI Layer 2 tags permitting the segregation of each Virtual Machine independent of Layer 3 communication.

Figure 5:
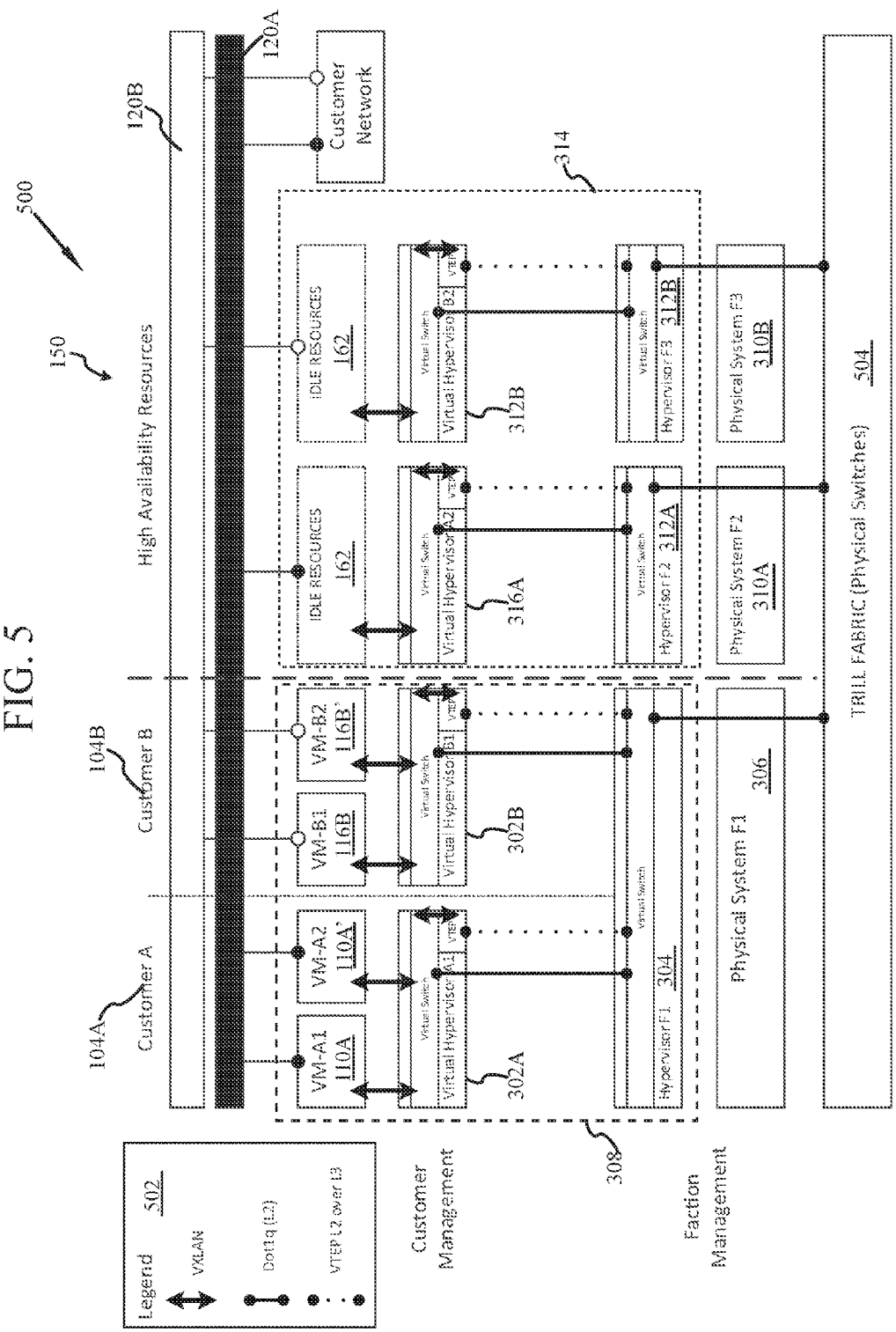
FIG. 5 illustrates a conceptual data flow diagram for the multi tenant data center of FIG. 3 upon a failover event according to at least one embodiment.

The flow of data between the above described components of MTDC 100 as well as the advantage of permitting software defined networking for the client systems, may be further appreciated with respect to FIG. 5 and the following description of traffic flow 500 as would exist for at least one embodiment regarding the initial state of Production Resources 102 shown in FIG. 3. Legend 502 further helps to identify the Layer 2 transactions and communications, which are indeed separate and apart from the Layer 3 transactions. A virtual machine, i.e. 110A, sends the traffic out the vmnic attached to the virtual machine and to the virtual switch. The nested hypervisor 302A receives the traffic from the virtual machine 110A via the virtual switch and encapsulates the traffic into a VXLAN segment utilizing the VTEP on the nested hypervisor 302A. The traffic is then transmitted on a dot1q VLAN, to the Physical Hypervisor F1 304 servicing the Nested Hypervisor 302A. The Physical Hypervisor 304 then forwards the traffic to the switch which encapsulates the traffic in TRILL w/FGL. The Trill Fabric 504 then forwards the traffic to the destination Physical Hypervisor or Physical Hypervisor servicing another Nested Hypervisor. As the traffic is passed through the port, the TRILL headers are removed and the header is restored so the traffic reaches the host as dot1q tagged, VXLAN encapsulated traffic bound for the Hypervisor's VTEP. If the Physical hypervisor is hosting the virtual machine the traffic is bound for, the VTEP removes the VXLAN information and passes the traffic to the virtual machine. If the traffic is bound for a nested hypervisor, the dot1q traffic is first passed through the virtual switch to the Nested Hypervisor before it reaches the VTEP to de-encapsulate the traffic.

Moreover the flow of data may be shown as:
VM to VM (Nested Hypervisor to Physical Hypervisor)

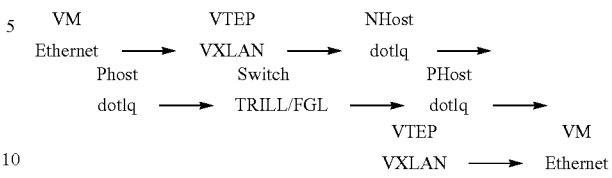

VM to VM (Nested Hypervisor to Nested Hypervisor)

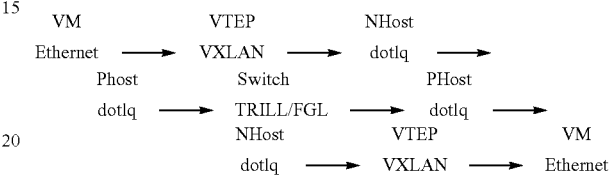

Figure 6:
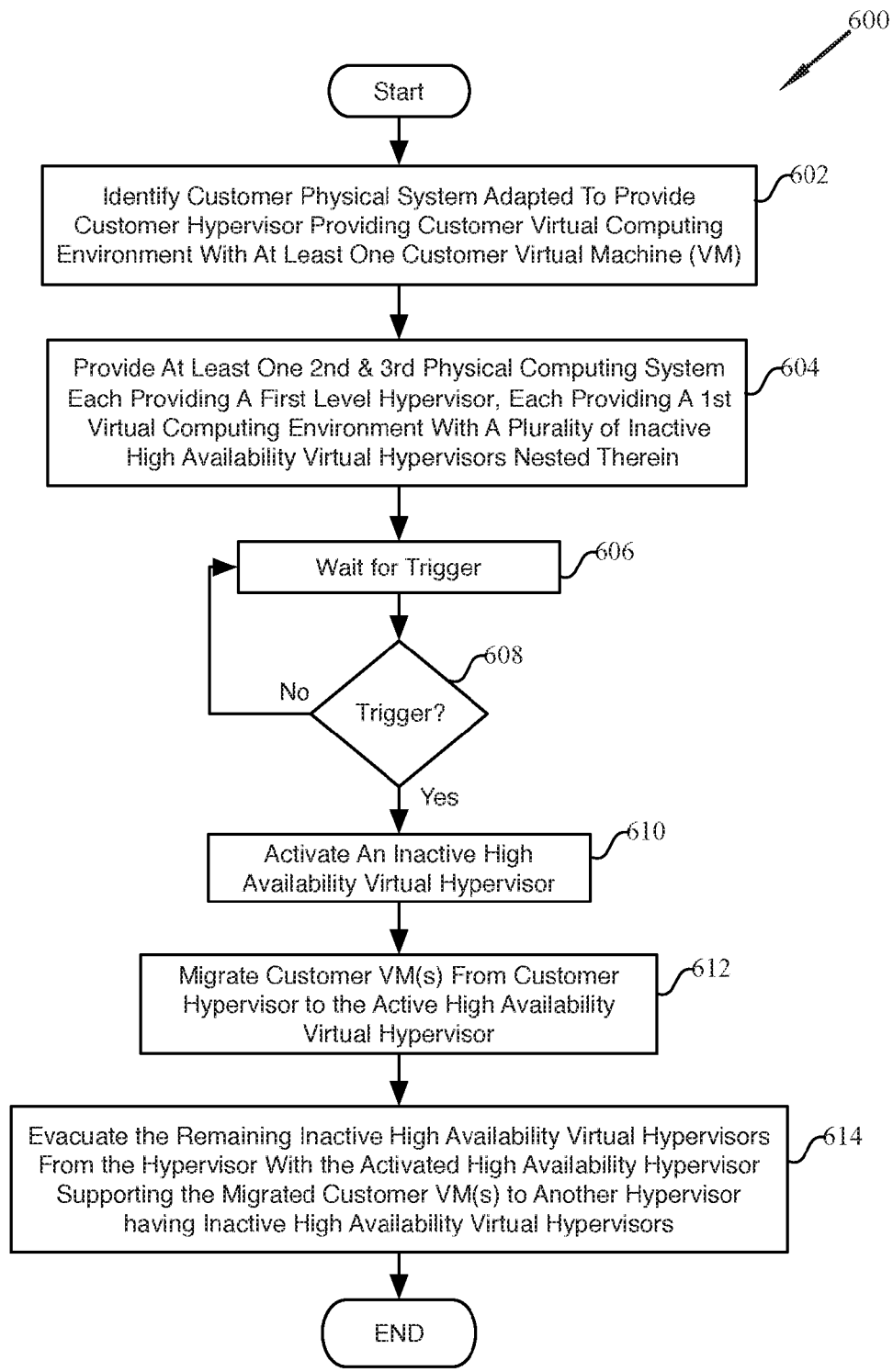
FIG. 6 illustrates a high level flow diagram for a method of establishing a multi tenant data center with nested hypervisors and the migration upon a failover event for an embodiment as shown in FIGS. 1 and 2.

FIG. 6 conceptually illustrates a high level flow diagram depicting at least one method 600 for a multi-tenant datacenter with nested hypervisors, e.g., MTDC 100, as shown in FIGS. 1 and 2. Further, FIG. 7 conceptually illustrates a high level flow diagram depicting at least one method 700 for a multi-tenant datacenter with nested hypervisors, e.g., MTDC 100, as shown in FIGS. 3 and 4. It will be understood and appreciated that the described methods need not be performed in the order in which it is herein described, but that this description is merely exemplary of at least two optional methods for providing MTDC 100 in accordance with a partially virtualized environment (FIG. 6) and a fully virtualized environment (FIG. 6).

Moreover, with respect to FIGS. 1 and 2 in connection with FIG. 6, the method 600 is shown to commence with identifying at least one customer Physical System 106 adapted to provide a Customer Hypervisor 108 providing a Customer Virtual Computing Environment 118 with at least one Customer Virtual Machine 110 disposed therein, block 602.

Method 600 continues with providing at least one Second and Third Physical Computing Systems 154 each providing a first layer Hypervisors 156, each first layer Hypervisors 156 providing a First Virtual Computing Environment 118 with a plurality of inactive Virtual Hypervisors nested therein, block 604.

With the basic essence of the MTDC 100 now established, method 600 waits for a Trigger event such as but not limited to a failure of the first physical computing system, e.g., Physical System A1 106, a request for high availability of resources at a level greater then those provided by the first physical computing system, e.g., Physical System A1 106, an indication of maintenance for the first physical computing system, e.g., Physical System A1 106, or other event, block 606.

Upon detection of a trigger event, decision 608, method 600 proceeds with migration of the customer VMs affected by the trigger event to the High Availability Resources as provided by NHVE 152.

More specifically, method 600 proceeds to activate an Inactive High Availability Virtual Hypervisor 160A, block 510. Method 600 then migrates the Customer VM(s), i.e. VM-A1 110A and VM-A2 110A' supported by Hypervisor A1 108, to the active High Availability Virtual Hypervisor 160A, supported by Hypervisor C1 156, block 512.

Method 600 continues by evacuating the remaining inactive High Availability Virtual Hypervisor 160B from the Hypervisor C1 156 supporting the active High Availability Virtual Hypervisor 160A to another Hypervisor, i.e. Hypervisor C2 156' having inactive High Availability Virtual Hypervisor 160B, block 514

Now, the failover virtual platform of the migrated Virtual Machines HA-VM-A1 202 and HA-VM-A2 202' appear and are operable as the production resources for the Customer 104 (See FIG. 2). The now active failover virtual platform of HA-VM-A1 202 and HA-VM-A2 202' is left alone until such time as it is desired to migrate the Virtual Machines back to the repaired, restored, replaced, or revived Physical System A1 106, or other system such that the failover virtual platform is once again returned to a state of failover backup readiness.

To summarize, for at least one embodiment provided is a method 600 for providing a multi-tenant datacenter 100 with nested hypervisors, comprising: providing at least a second and third physical computing systems 154 each having at least one processor and memory store adapted to provide a first level hypervisor 156, each providing a First Virtual Computing Environment with a plurality of inactive Virtual Hypervisors 160 nested therein; identifying a customer physical computing system 106 having at least one processor and at least one memory store adapted to provide a Customer Hypervisor 108 providing a Customer Virtual Computing Environment with at least one Customer Virtual Machine (VM) 110; and in response to a trigger: activating an inactive Virtual Hypervisor 160B to provide an active hypervisor 160A; migrating the at least one customer VM 110 from the Customer Hypervisor 108 to the active Virtual Hypervisor 160A; and evacuating the remaining inactive Virtual Hypervisors 160B from the Hypervisor 156 with the active Virtual Hypervisor 160A to at least one other hypervisor 156' having inactive Virtual Hypervisors 160B.

Figure 7:
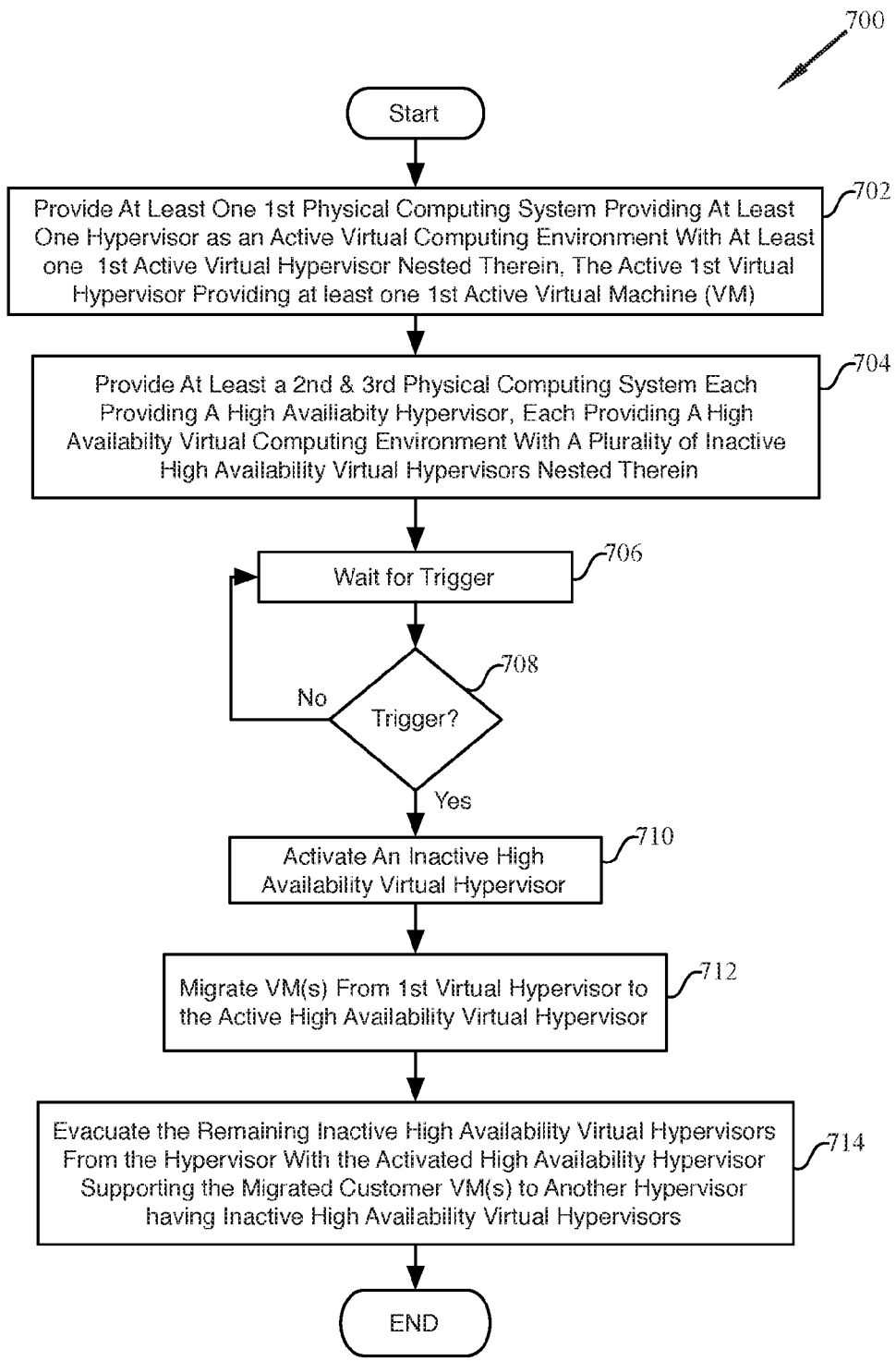
FIG. 7 illustrates a high level flow diagram for a method of establishing a multi tenant data center with nested hypervisors and the migration upon a failover event for an embodiment as shown in FIGS. 3 and 4.

The method 700 shown in FIG. 7 for the fully virtualized environment is quite similar. Specifically, with respect to FIGS. 3 and 4 in connection with FIG. 7, the method 700 commences by providing at least one physical computing system 306 providing at least one first active Hypervisor 306 as an active Virtual Computing Environment 308 with at least one first active Virtual Hypervisor 302 nested therein, the active Virtual Hypervisor 302 providing at least one first active Virtual Machine 110 (VM), block 702.

Method 700 continues with providing at least a Second and Third Physical Computing Systems 310 each providing a High Availability Hypervisors 312, each High Availability Hypervisors 312 providing a First Virtual Computing Environment, aka a High Availability Virtual Computing Environment 314 with a plurality of inactive Virtual Hypervisors 316 nested therein, block 704.

With the basic essence of the MTDC 100 now established, method 700 waits for a Trigger event such as but not limited to a failure of the first physical computing system, e.g., Physical System A1 306, a request for high availability of resources at a level greater then those provided by the first physical computing system, e.g., Physical System A1 306 or the virtualized system provided by Hypervisor F1 304, an indication of maintenance for the first physical computing system, e.g., Physical System A1 106, or other event, block 706.

Upon detection of a trigger event, decision 708, method 700 proceeds with migration of the customer VMs affected by the trigger event to the High Availability Resources as provided by NHVE 152.

More specifically, method 700 proceeds to activate an Inactive High Availability Virtual Hypervisor 316A, block 610. Method 700 then migrates the Customer VM(s), i.e. VM-A1 110A and VM-A2 110A' supported by Hypervisor A1 302A, to the active High Availability Virtual Hypervisor 316A, supported by Hypervisor F2 312A, block 612.

Method 700 continues by evacuating the remaining inactive High Availability Virtual Hypervisor 316B from the Hypervisor F2 312A supporting the active High Availability Virtual Hypervisor 316A to another Hypervisor, i.e. Hypervisor F3 312B having inactive High Availability Virtual Hypervisor 160B, block 614

Now, the failover virtual platform of the migrated Virtual Machines HA-VM-A1 202 and HA-VM-A2 202' appear and are operable as the production resources for the Client 102 (See FIG. 4). The now active failover virtual platform of HA-VM-A1 202 and HA-VM-A2 202' is left alone, until such time as it is desired to migrate the Virtual Machines back to the repaired, restored, replaced, or revived Physical System F1 310, providing the first virtual environment of Hypervisor F1 304, or other system such that the failover virtual platform is once again returned to a state of failover backup readiness.

To summarize, for at least one embodiment provided is a method 700 for providing a multi-tenant datacenter 100 with nested hypervisors, comprising: providing at least one physical computing system 310 having at least one processor and memory store adapted to provide at least one Hypervisor 304 an active Virtual Computing Environment with at least one first active Virtual Hypervisor 302 nested therein, the active Virtual Hypervisor 302 providing at least one first active Virtual Machine (VM) 110; providing at least a second and third physical computing systems 310 each having at least one processor and memory store adapted to provide a High Availability Hypervisor 312, each High Availability Hypervisor 312 providing a High Availability Virtual Computing Environment 314 with a plurality of inactive High Availability Virtual Hypervisors 316 nested therein; and in response to a trigger: activating an inactive Virtual Hypervisor 316B to provide a second active Virtual Hypervisor 316A; migrating the at least one first active VM 110 from the first active virtual Hypervisor 302 to the second active Virtual Hypervisor 316A; and evacuating the remaining inactive second Virtual Hypervisors 316B from the Hypervisor 312A with the active second Virtual Hypervisor 316A to at least one other hypervisor 312B having inactive Virtual Hypervisors 316B.

With respect to the above description of MTDC 100, multiple instances of MTDCs, and methods as described above it is understood and appreciated that the method may be rendered in a variety of different forms of code and instruction as may be used for different computer systems and environments.

Figure 8:
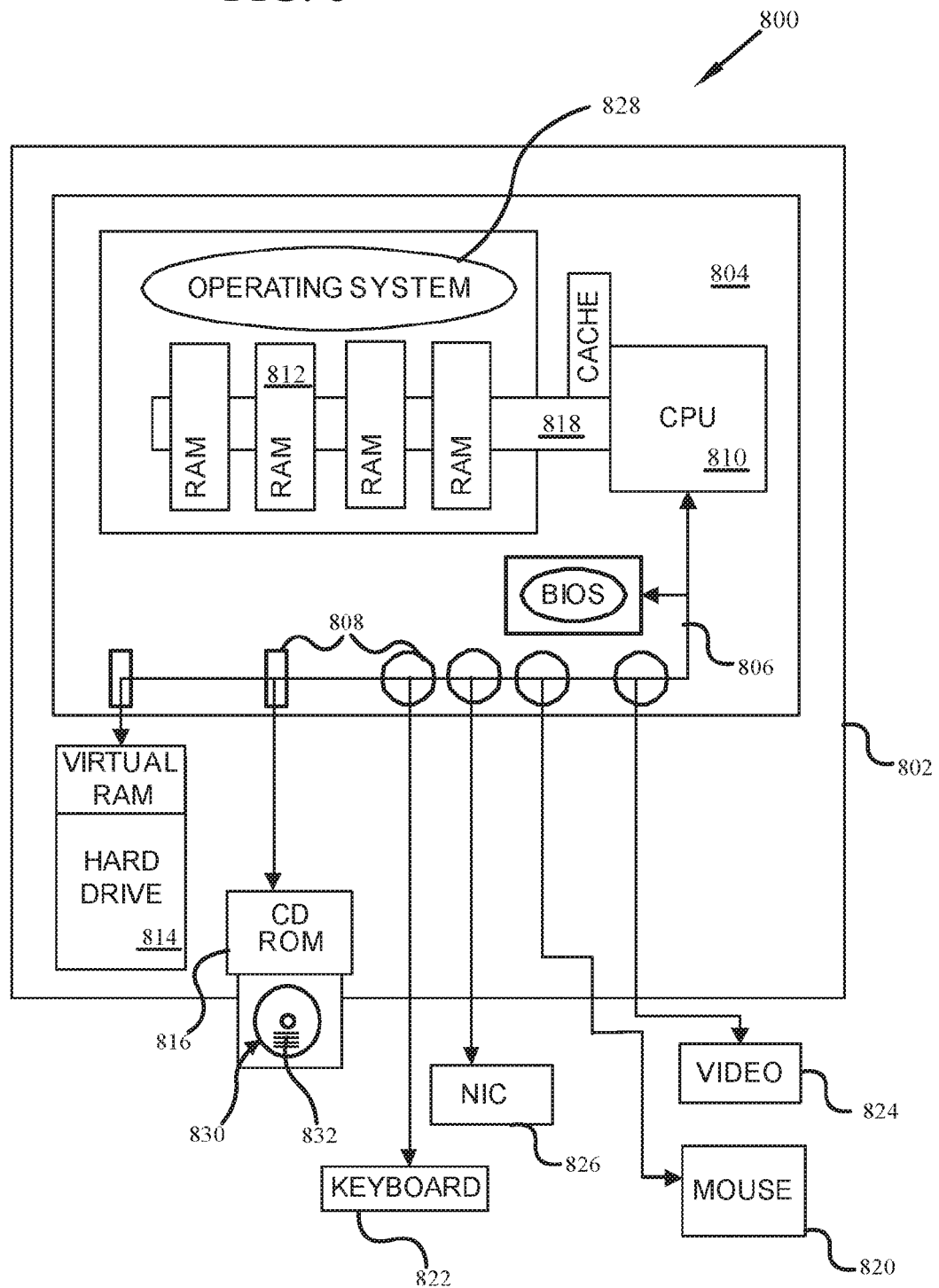
FIG. 8 is a block diagram of a computer system in accordance with certain embodiments of the present invention.

To expand upon the initial suggestion of customer systems 104 and Physical System 106, 154, 164, 306, 310, FIG. 8 is a high level block diagram of an exemplary computer system 800. Computer system 800 has a case 802, enclosing a main board 804. The main board 804 has a system bus 806, connection ports 808, a processing unit, such as Central Processing Unit (CPU) 810 with at least one microprocessor (not shown) and a memory storage device, such as main memory 812, hard drive 814 and CD/DVD ROM drive 816.

Memory bus 818 couples main memory 812 to the CPU 810. A system bus 806 couples the hard disc drive 814, CD/DVD ROM drive 816 and connection ports 808 to the CPU 810. Multiple input devices may be provided, such as, for example, a mouse 820 and keyboard 822. Multiple output devices may also be provided, such as, for example, a video monitor 824 and a printer (not shown). As computer system 800 is intended to be interconnected with other computer systems in the MTDC 100 a combined input/output device such as at least one network interface card, or NIC 826 is also provided.

Computer system 800 may be a commercially available system, such as a desktop workstation unit provided by IBM, Dell Computers, Gateway, Apple, or other computer system provider. Computer system 800 may also be a networked computer system, wherein memory storage components such as hard drive 814, additional CPUs 810 and output devices such as printers are provided by physically separate computer systems commonly connected together in the network. Those skilled in the art will understand and appreciate that the physical composition of components and component interconnections are comprised by the computer system 800, and select a computer system 800 suitable for one or more of the computer systems incorporated in the formation and operation of MTDC 100.

When computer system 800 is activated, preferably an operating system 828 will load into main memory 812 as part of the boot strap startup sequence and ready the computer system 800 for operation. At the simplest level, and in the most general sense, the tasks of an operating system fall into specific categories, such as, process management, device management (including application and user interface management) and memory management, for example. The form of the computer-readable medium 830 and language of the program 832 are understood to be appropriate for and functionally cooperate with the computer system 800.

Moreover, variations of computer system 800 may be adapted to provide the physical elements of one or more components comprising each Physical System 106, 154, 164, 306, 310, the one or more components comprising the system supporting the cloud environment, the switches, routers and such other components as may be desired and appropriate for MTDC 100.

It is to be understood that changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A multi-tenant datacenter with nested hypervisors, comprising:
    at least one first physical computing system having at least one processor and at least one memory store adapted to provide a Customer Hypervisor providing a Customer Virtual Computing Environment with at least one Customer Virtual Machine (VM);
    at least a second and third physical computing systems each having at least one processor and memory store adapted to provide at least a First Hypervisor by the second Physical System and a Second Hypervisor by the third Physical System, each providing a First Virtual Computing Environment with a plurality of inactive Virtual Hypervisors nested therein;
    the multi tenant data center structured and arranged to activate a Virtual Hypervisor in the First Hypervisor and automatically migrate the at least one Customer VM from the Customer Hypervisor to the Active Virtual Hypervisor that utilizes at least one high availability resource directly from the second physical computing system through the first hypervisor and evacuate the remaining inactive Virtual Hypervisors from the First Hypervisor to the Second Hypervisor supporting the active Virtual Hypervisor to the Second Hypervisor supporting inactive Virtual Hypervisors; and
    wherein each Customer Virtual Machine in the Active Virtual Hypervisor is coupled to the second physical computing system by OSI Layer 2, prior to an OSI Layer 3 connection, for the transfer of data frames, each frame having a plurality of OSI Layer 2 tags permitting the segregation of each Virtual Machine independent of Layer 3 communication.

2. The multi-tenant datacenter with nested hypervisors of claim 1, wherein supporting the at least one customer VM on the active Virtual Hypervisor and evacuating all other inactive hypervisors from the first hypervisor permits a customer to control software defined networking within the active Virtual Hypervisor.

3. The multi-tenant datacenter with nested hypervisors of claim 1, wherein the first and second Hypervisors providing the plurality of inactive Virtual Hypervisors nested therein are provided by a plurality of different physical bare metal systems.

4. The multi-tenant datacenter with nested hypervisors of claim 3, wherein the plurality of physical bare metal systems are a mixture of different computer types, generations, and versions of hardware, combined as a new virtualized computing resource provided as at least the First and Second Hypervisors.

5. The multi-tenant datacenter with nested hypervisors of claim 1, wherein the Layer 2 tags permit active virtual Hypervisors to support Virtual Machines with overlapping IP ranges and VLANS.

6. The multi-tenant datacenter with nested hypervisors of claim 1, wherein the activation of a Virtual Hypervisor for the migration of the at least one Customer VM and evacuation of the inactive Virtual Hypervisors is in response to a failure of the customer computing system.

7. The multi-tenant datacenter with nested hypervisors of claim 1, wherein the automatic migration is performed transparently to at least one user.

8. The multi-tenant datacenter with nested hypervisors of claim 1, wherein the migration of the at least one customer VM and the evacuation of the inactive Virtual Hypervisors are performed about contemporaneously.

9. The multi-tenant datacenter with nested hypervisors of claim 1, wherein the activation of a Virtual Hypervisor for the migration of the at least one Customer VM and evacuation of the inactive Virtual Hypervisors is in response to maintenance of the customer computing system.

10. The multi-tenant datacenter with nested hypervisors of claim 1, wherein the at least one customer physical computing system provides a first level of available resources, the activation of the Virtual Hypervisor for the migration of the at least one Customer VM and evacuation of the inactive Virtual Hypervisors is to provide a greater level of available resources than is provided by the customer computing system.

11. The multi-tenant datacenter with nested hypervisors of claim 1, wherein at least one Virtual Hypervisor has a set of virtual characteristics for a computing environment that are distinct from the second physical computing environment.

12. The multi-tenant datacenter with nested hypervisors of claim 1, wherein the at least one first physical computing system is a customer physical computing system.

13. A method for providing a multi-tenant datacenter with nested hypervisors, comprising:

identifying a customer physical computing system having at least one processor and at least one memory store adapted to provide a Customer Hypervisor providing a Customer Virtual Computing Environment with at least one Customer Virtual Machine (VM);

providing at least a second and third physical computing systems each having at least one processor and memory store adapted to provide a first level Hypervisor, each first level hypervisor providing a First Virtual Computing Environment with a plurality of inactive Virtual Hypervisors nested therein; and in response to a trigger:

activating an inactive Virtual Hypervisor to provide an active Virtual Hypervisor;

migrating the at least one customer VM from the Customer Hypervisor to the active Virtual Hypervisor that utilizes at least one high availability resource directly from the second physical computing system through the first hypervisor;

evacuating the remaining inactive Virtual Hypervisors from the one of the at least two Hypervisor with the active Virtual Hypervisor to at least one other hypervisor having inactive Virtual Hypervisors; and wherein each Customer Virtual Machine in the Active Virtual Hypervisor is coupled to the second physical computing system by OSI Layer 2, prior to an OSI Layer 3 connection, for the transfer of data frames, each frame having a plurality of OSI Layer 2 tags permitting the segregation of each Virtual Machine independent of Layer 3 communication.

14. The method for providing a multi-tenant datacenter with nested hypervisors of claim 13, wherein the trigger is a failure of the customer computing system.

15. The method for providing a multi-tenant datacenter with nested hypervisors of claim 13, wherein the first and second Hypervisors providing the plurality of inactive Virtual Hypervisors nested therein are provided by a plurality of different physical bare metal systems.

16. The method for providing a multi-tenant datacenter with nested hypervisors of claim 15, wherein the plurality of physical bare metal systems are a mixture of different computer types, generations, and versions of hardware, combined as a new virtualized computing resource provided as at least the First and Second Hypervisors.

17. The method for providing a multi-tenant datacenter with nested hypervisors of claim 13, wherein the trigger is a request to provide a greater level of available resources than is provided by the customer computing system.

18. The method for providing a multi-tenant datacenter with nested hypervisors of claim 13, wherein the trigger is a maintenance request of the customer computing system.

19. The method for providing a multi-tenant datacenter with nested hypervisors of claim 13, wherein the migration is performed transparently to at least one user.

20. The method for providing a multi-tenant datacenter with nested hypervisors of claim 13, wherein the migration of the at least one customer VM and the evacuation of the inactive Virtual Hypervisors are performed about contemporaneously.

21. The method for providing a multi-tenant datacenter with nested hypervisors of claim 13, wherein supporting the at least one customer VM on the active Virtual Hypervisor and evacuating all other inactive hypervisors from the first hypervisor permits a customer to control software defined networking within the active Virtual Hypervisor.

22. The method for providing a multi-tenant datacenter with nested hypervisors of claim 13, wherein each Customer Virtual Machine in the Active Virtual Hypervisor is coupled to the second physical computing system by OSI Layer 2, prior to an OSI Layer 3 connection, for the transfer of data frames, each frame having a plurality of OSI Layer 2 tags permitting the segregation of each Virtual Machine independent of Layer 3 communication.

23. The method for providing a multi-tenant datacenter with nested hypervisors of claim 22, wherein the Layer 2 tags permit active virtual Hypervisors within the multi tenant data center to support Virtual Machines with overlapping IP ranges and VLANS.

24. A multi-tenant datacenter with nested hypervisors, comprising:

at least a first and second physical computing system each having at least one processor and memory store adapted to provide at least a First Hypervisor by the first Physical System and a Second Hypervisor by the second Physical System, each providing a First Virtual Computing Environment with a plurality of inactive Virtual Hypervisors nested therein;

the multi tenant data center structured and arranged to activate a Virtual Hypervisor on one of the at least two Hypervisors and automatically migrate at least one Customer VM from a Customer Hypervisor on a physical computing system having at least one processor and at least one memory to the Active Virtual Hypervisor that utilizes at least one high availability resource directly from one of the first and second physical computing systems through one of the at least two Hypervisors;

and evacuate the remaining inactive Virtual Hypervisors from the Hypervisor supporting the Active Hypervisor to another of the at least two hypervisors supporting inactive Virtual Hypervisors;

wherein each Customer Virtual Machine in the Active Virtual Hypervisor is coupled to the at least one physical computing system by OSI Layer 2, prior to an OSI Layer 3 connection, for the transfer of data frames, each frame having a plurality of OSI Layer 2 tags permitting the segregation of each Virtual Machine independent of Layer 3 communication.

25. The multi-tenant datacenter with nested hypervisors of claim 24, wherein supporting the at least one customer VM on the active Virtual Hypervisor and evacuating all other inactive hypervisors from the first hypervisor permits a customer to control software defined networking within the active Virtual Hypervisor.

26. The multi-tenant datacenter with nested hypervisors of claim 24, wherein the first and second Hypervisors providing the plurality of inactive Virtual Hypervisors nested therein are provided by a plurality of different physical bare metal systems.

27. The multi-tenant datacenter with nested hypervisors of claim 26, wherein the plurality of physical bare metal systems are a mixture of different computer types, generations, and versions of hardware, combined as a new virtualized computing resource provided as at least the First and Second Hypervisors.

28. The multi-tenant datacenter with nested hypervisors of claim 24, wherein the Layer 2 tags permit active virtual Hypervisors to support Virtual Machines with overlapping IP ranges and VLANS.

29. The multi-tenant datacenter with nested hypervisors of claim 24, wherein the activation of a Virtual Hypervisor for the migration of the at least one Customer VM and evacuation of the inactive Virtual Hypervisors is in response to a failure of the customer computing system.

30. The multi-tenant datacenter with nested hypervisors of claim 24, wherein the automatic migration is performed transparently to at least one user.

31. The multi-tenant datacenter with nested hypervisors of claim 24, wherein the migration of the at least one customer VM and the evacuation of the inactive Virtual Hypervisors are performed about contemporaneously.

32. The multi-tenant datacenter with nested hypervisors of claim 24, wherein the activation of a Virtual Hypervisor for the migration of the at least one Customer VM and evacuation of the inactive Virtual Hypervisors is in response to maintenance of the customer computing system.

33. The multi-tenant datacenter with nested hypervisors of claim 24, wherein the at least one customer physical computing system provides a first level of available resources, the activation of the Virtual Hypervisor for the migration of the at least one Customer VM and evacuation of the inactive Virtual Hypervisors is to provide a greater level of available resources than is provided by the customer computing system.

34. The multi-tenant datacenter with nested hypervisors of claim 24, wherein at least one Virtual Hypervisor has a set of virtual characteristics for a computing environment that are distinct from the second physical computing environment.

35. A multi-tenant datacenter with nested hypervisors, comprising:
at least one first physical computing system having at least one processor and memory store adapted to provide at least one Hypervisor as an active Virtual Computing Environment with at least one active Virtual Hypervisor nested therein, the active Virtual Hypervisor providing at least one active Virtual Machine;
at least a second and third physical computing systems each having at least one processor and memory store adapted provide a High Availability Hypervisor, each providing a High Availability Virtual Computing Environment with a plurality of inactive High Availability Virtual Hypervisors nested therein, the multi tenant data center structured and arranged to activate a High Availability Virtual Hypervisor on one of the at least two High Availability Hypervisors and automatically migrate the at least one active VM from the Active Virtual Hypervisor to the Active High Availability Virtual Hypervisor that utilizes the high availability of at least one resource directly from one of the second and third physical computing systems through one of the at least two High Availability Hypervisors and evacuate the remaining inactive High Availability Virtual Hypervisors from the one of the at least two High Availability Hypervisor supporting the Active High Availability Hypervisor to another of the at least two High Availability hypervisors supporting inactive Virtual Hypervisors;
wherein each Virtual Machine in the Active High Availability Virtual Hypervisor is coupled to the second physical computing system by OSI Layer 2, prior to an OSI Layer 3 connection, for the transfer of data frames, each frame having a plurality of OSI Layer 2 tags permitting the segregation of each Virtual Machine independent of Layer 3 communication.

36. The multi-tenant datacenter with nested hypervisors of claim 35, wherein supporting the at least one customer VM on the active Virtual Hypervisor and evacuating all other inactive hypervisors from the first hypervisor permits a customer to control software defined networking within the active Virtual Hypervisor.

37. The multi-tenant datacenter with nested hypervisors of claim 35, wherein the first and second Hypervisors providing the plurality of inactive Virtual Hypervisors nested therein are provided by a plurality of different physical bare metal systems.

38. The multi-tenant datacenter with nested hypervisors of claim 37, wherein the plurality of physical bare metal systems are a mixture of different computer types, generations, and versions of hardware, combined as a new virtualized computing resource provided as at least the First and Second Hypervisors.

39. The multi-tenant datacenter with nested hypervisors of claim 35, wherein the Layer 2 tags permit active virtual Hypervisors to support Virtual Machines with overlapping IP ranges and VLANS.

40. The multi-tenant datacenter with nested hypervisors of claim 35, wherein the activation of a Virtual Hypervisor for the migration of the at least one Customer VM and evacuation of the inactive Virtual Hypervisors is in response to a failure of the customer computing system.

41. The multi-tenant datacenter with nested hypervisors of claim 35, wherein the automatic migration is performed transparently to at least one user.

42. The multi-tenant datacenter with nested hypervisors of claim 35, wherein the migration of the at least one customer VM and the evacuation of the inactive Virtual Hypervisors are performed about contemporaneously.

43. The multi-tenant datacenter with nested hypervisors of claim 35, wherein the activation of a Virtual Hypervisor for the migration of the at least one Customer VM and evacuation of the inactive Virtual Hypervisors is in response to maintenance of the customer computing system.

44. The multi-tenant datacenter with nested hypervisors of claim 35, wherein the at least one customer physical computing system provides a first level of available resources, the activation of the Virtual Hypervisor for the migration of the at least one Customer VM and evacuation of the inactive Virtual Hypervisors is to provide a greater level of available resources than is provided by the customer computing system.

45. The multi-tenant datacenter with nested hypervisors of claim 35, wherein at least one Virtual Hypervisor has a set of virtual characteristics for a computing environment that are distinct from the second physical computing environment.

46. A method for providing a multi-tenant datacenter with nested hypervisors, comprising:
providing at least one first physical computing system having at least one processor and memory store adapted to provide at least one Hypervisor as an active Virtual Computing Environment with at least one first active Virtual Hypervisor nested therein, the active Virtual Hypervisor providing at least one first active Virtual Machine (VM);
providing at least a second and third physical computing systems each having at least one processor and memory store adapted to provide a High Availability Hypervisor, each High Availability Hypervisor providing a High Availability Virtual Computing Environment with a plurality of inactive High Availability Virtual Hypervisors nested therein; and
in response to a trigger:
activating an inactive Virtual Hypervisor to provide a second active Virtual Hypervisor;
migrating the at least one first active VM from the first active virtual Hypervisor to the second active Virtual Hypervisor that utilizes the high availability of at least one resource directly from one of the second and third physical computing systems through one of the at least two High Availability Hypervisors;

evacuating the remaining inactive Virtual Hypervisors from the one of the at least two Hypervisor with the active second Virtual Hypervisor to at least one other hypervisor having inactive Virtual Hypervisors; and wherein each Virtual Machine in the Active High Availability Virtual Hypervisor is coupled to the second physical computing system by OSI Layer 2, prior to an OSI Layer 3 connection, for the transfer of data frames, each frame having a plurality of OSI Layer 2 tags permitting the segregation of each Virtual Machine independent of Layer 3 communication.

47. The method for providing a multi-tenant datacenter with nested hypervisors of claim 46, wherein the trigger is a failure of the first computing system.

48. The method for providing a multi-tenant datacenter with nested hypervisors of claim 46, wherein the trigger is a request to provide a greater level of available resources than is provided by the first computing system.

49. The method for providing a multi-tenant datacenter with nested hypervisors of claim 46, wherein the trigger is a maintenance request of the first computing system.

50. The method for providing a multi-tenant datacenter with nested hypervisors of claim 46, wherein the first and second Hypervisors providing the plurality of inactive Virtual Hypervisors nested therein are provided by a plurality of different physical bare metal systems.

51. The method for providing a multi-tenant datacenter with nested hypervisors of claim 50, wherein the plurality of physical bare metal systems are a mixture of different computer types, generations, and versions of hardware, combined as a new virtualized computing resource provided as at least the First and Second Hypervisors.

52. The method for providing a multi-tenant datacenter with nested hypervisors of claim 46, wherein the migration is performed transparently to at least one user.

53. The method for providing a multi-tenant datacenter with nested hypervisors of claim 46, wherein the migration of the at least one first active VM and the evacuation of the inactive Virtual Hypervisors are performed about contemporaneously.

54. The method for providing a multi-tenant datacenter with nested hypervisors of claim 46, wherein supporting the at least one first active VM on the second active Virtual Hypervisor and evacuating all other inactive hypervisors from the second hypervisor permits a customer to control software defined networking within the active Virtual Hypervisor.

55. The method for providing a multi-tenant datacenter with nested hypervisors of claim 46, wherein each Virtual Machine in an Active Virtual Hypervisor is coupled to the second physical computing system by OSI Layer 2, prior to an OSI Layer 3 connection, for the transfer of data frames, each frame having a plurality of OSI Layer 2 tags permitting the segregation of each Virtual Machine independent of Layer 3 communication.

56. The method for providing a multi-tenant datacenter with nested hypervisors of claim 55, wherein the Layer 2 tags permit active virtual Hypervisors within the multi tenant data center to support Virtual Machines with overlapping IP ranges and VLANS.

\* \* \* \* \*